(12) United States Patent
Takahashi

(10) Patent No.: US 7,609,057 B2
(45) Date of Patent: Oct. 27, 2009

(54) ROTATION ANGLE DETECTOR AND BEARING ASSEMBLY USING THE SAME

(75) Inventor: Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 531 days.

(21) Appl. No.: 11/521,561

(22) Filed: Sep. 15, 2006

(65) Prior Publication Data

US 2007/0063696 A1 Mar. 22, 2007

(30) Foreign Application Priority Data

Sep. 22, 2005 (JP) ............................ 2005-276601
Jan. 6, 2006 (JP) ............................ 2006-001232
Jan. 6, 2006 (JP) ............................ 2006-001233

(51) Int. Cl.
*G01B 7/30* (2006.01)

(52) U.S. Cl. .............................. 324/207.25; 73/514.39

(58) Field of Classification Search ......... 324/173–174, 324/207.25; 338/32 R, 32 H; 123/612, 617; 73/514.39, 862.192, 862.193, 862.331, 862.332
See application file for complete search history.

(56) References Cited

U.S. PATENT DOCUMENTS

| 2002/0077752 | A1 | 6/2002 | Burreson et al. |
| 2004/0118220 | A1 | 6/2004 | Takuma |

FOREIGN PATENT DOCUMENTS

| JP | 2004-037133 | 2/2004 |
| WO | WO 2006/064687 A1 | 6/2006 |

OTHER PUBLICATIONS

James T. Clark, "Split-drain MOSFET Magnetic Sensor Arrays", Sensors and Actuators, A 24 (1990), pp. 107-116.
Partial European Search Report, mailed Jan. 31, 2007, and issued in corresponding European Patent Application No. 06019919.7-1236.

*Primary Examiner*—Bot L LeDynh

(57) ABSTRACT

To provide a rotation angle detecting device capable of achieving a detection of the angle of rotation at a high speed and with high accuracy and a bearing assembly utilizing such rotation angle detecting device, the rotation angle detecting device includes a magnetic generator (4) arranged on a rotatable member (1) and a plurality of linear magnetic sensor arrays (5A to 5D) arranged on a stationary member (2), so that a zero-crossing-position in a distribution of magnetic field can be detected from respective outputs of the magnetic sensor arrays (5A to 5D) and the rotation angle of the magnetic generator (4) can be detected from the detected zero-crossing-position. While based on the previous zero-crossing-position, the subsequent scanning range of the magnetic sensor arrays (5A to 5D) is set, the zero-crossing-position is detected within this limited scanning range.

7 Claims, 17 Drawing Sheets

ROTATION ANGLE DETECTOR AND BEARING ASSEMBLY USING THE SAME

BACKGROUND OF THE INVENTION 1. (Field of the Invention)

The present invention generally relates to a device for detecting the angle of rotation utilizable with various equipments and, more particularly, to the rotation angle detecting device for use in controlling the rotation of, for example, a compact drive motor or for use in detecting the angle of rotation for eventually detecting the position of, for example, a business machine. The present invention also relates to a bearing assembly utilizing such rotation angle detecting device and to a magnetic sensor array circuit utilizable in such rotation angle detecting device.

2. (Description of the Prior Art)

The applicant of the present invention has suggested in, for example, the Japanese Laid-open Patent Publication No. 2004-37133, published Feb. 5, 2004, or the Published International Application WO2006/064687A1, a rotation angle detecting device which utilizes magnetic sensor arrays and is therefore capable of detecting the angle of rotation with high precision. This known rotation angle detecting device includes magnetic sensor arrays comprised of a plurality of arrayed magnetic sensor elements integrated on a sensor chip together with a signal amplifying circuit, an analog-to-digital converter circuit and a digital signal processing circuit, which sensor chip is arranged in face-to-face relation with a magnet mounted on a rotatable member. The magnet is of a kind having a magnetic anisotropy in a circumferential direction and, on the other hand, the four linear arrays of magnetic sensors are arranged on the sensor chip so as to assume respective positions represented by the four sides of the imaginary shape of a rectangle.

With the rotation angle detecting device of the known structure discussed above, each of the magnetic sensor arrays is utilized to detect a distribution of magnetic fields in a direction perpendicular to the sensor chip, and respective outputs from those magnetic sensor arrays are then fed to the digital signal processing circuit through the signal amplifying circuit and then through the analog-to-digital (A/D) converter circuit so that the digital signal processing circuit can detect the zero-crossing-position corresponding to the NS boundary line of the magnetic field distribution on each of the magnetic sensor arrays to thereby detect the angle of rotation of the magnet.

In this case, since the size of the sensor chip is affected by the size of the magnetic sensor arrays, the rotation angle detecting device in its entirety can be compactized if the magnetic sensor arrays have their sizes reduced. Also, if the size of the magnetic sensor arrays is reduced, the surface area of the sensor chip can be reduced, bringing about an effect of reducing the cost of manufacture.

In his work, "Split-drain MOSFET Magnetic Sensor Arrays", published in "Sensors and Actuators", A24 (1990), pp. 107-116, James J. Clark describes the method of detecting the distribution of magnetic field by means of the magnetic sensor elements, MAGFETs, arranged in a matrix. He also describes the use of a read-out circuit in the form of a simplified voltage converting circuit, pointing out that the offset variation is remarkable in sensor output.

In the case of the rotation angle detecting device suggested by the applicant of the present invention, the smaller the length of time required for processing the sensor signals, which includes scanning the sensor signals, reading out them from the magnetic sensor arrays, and outputting the result of calculation of the angle by means of the digital signal processing circuit, the faster the angle can be detected, and the output delay time can therefore be reduced. Reduction of the output delay time is particularly desired for in detecting the angle of rotation of an object rotating at a high speed, detecting the angle of rotation in a control device requiring a high speed response and so on.

The reduction of the output time tends to be limited by the length of time required to read out the sensor signals and the length of time required for the calculating process of the rotation angle performed by the digital signal processing circuit. In particular, the length of time required to read out the sensor signals tends to increase with increase of the number of the magnetic sensor elements arranged to form the magnetic sensor arrays. Moreover, since the increased number of the magnetic sensor elements leads to increase of the number of data extracted to determine the zero-crossing-position by means of the digital signal processing circuit, the length of time required to complete the calculating process of the rotation angle is increased. In summary, if the number of the magnetic sensor elements forming the magnetic sensor arrays increases, the delay in time subsequent to the reading out of the sensor signals and before outputting the result of detection of the rotational angle will become large. Although the delay time referred to above may be reduced if the number of the magnetic sensor elements is small, the accuracy of detection of the rotation angle will be conversely lowered.

Also, since the accuracy of detection of the angle depends on the distance between two zero-crossing-positions detected on the magnetic sensor arrays, there is a problem in that the detection accuracy will be lowered if the distance between the two zero-crossing-positions is reduced as a result of downsizing of the magnetic sensor arrays as discussed above.

As a means to solve this problem, it may be contemplated, for example, to integrate the sensor signals read out from the magnetic sensor arrays or to calculate a mean value of the sensor signals, but this leads to reduction of the detection rate of the angle.

In view of the foregoing, a technology effective to reduce the cost of manufacturing by downsizing the sensor chip is desired, which does not lower the detecting speed, which is effective to keep a high detecting accuracy.

According to the Published International Application WO2006/064687A1 referred to above, where the angle of rotation of the magnet is to be determined in reference to the outputs from the magnetic sensor arrays, there is a problem in that since an offset variation exists among those respective outputs from the magnetic sensor elements, the accuracy of detection of the rotation angle tends to be reduced. In order to alleviate this problem, the applicant of the present invention has suggested that in the magnetic sensor arrays utilizing the magnetic sensor elements, MAGFETs, the offset variation can be reduced when the magnetic sensor elements are connected in parallel.

In the case of this technology of reducing the offset variation, although when four to eight magnetic sensor elements are connected in parallel, the offset variation can be reduced to a value of about ½ to about ⅓, the offset variation has to be further reduced in order to secure a sufficient accuracy of detection of the rotation angle.

On the other hand, in the sensor chip made of semiconductor, change in characteristic with change in environment such as, for example, temperature is inevitable. In other words, in the case of the sensor unit of the structure described above, the sensor output signal drifts with change in environment and the signal read-out circuit is also adversely affected by the change in environment and, therefore, there is a problem in that the accuracy of detection of the rotation angle eventually obtained tends to be lowered.

For those problems, the reduction is desired for by improving a method of driving the sensors and a circuit configuration of the read-out circuit. As a problem to be resolved, there is the need to reduce further the inherent offset variation of the sensors and to realize a circuit configuration for reading out the sensor signals without being adversely affected by the change in environment.

As far as the circuit configuration is concerned, the Japanese Patent Application No. 2005-167127 suggests the use of a reference sensor element short-circuiting between two output terminals thereof, storing as a reference offset value the sensor signal read out of the selected reference sensor element, and subtracting the stored reference offset value from the output of other magnetic sensor elements.

According to the suggested circuit configuration, since the reference sensor element is free from offset since the two output terminals of the magnetic sensor element are short-circuited, only an offset error, generated internally in the read-out circuit comprised of an amplifying circuit and others is extracted and appears in the output. This offset error is stored as the reference offset value and the offset value is subtracted from the output of the other magnetic sensor element. Accordingly, even though the respective circuit statuses of the magnetic sensor element and the magnetic sensor array circuit change with change in, for example, temperature, the charge of the circuit statuses can be corrected by utilizing the offset error of the circuit occasionally measured as described above. For this reason, the stable output signal that is hardly affected by the environment can be obtained.

However, since a magnetic sensor element forming a part of the magnetic sensor array is used as the dedicated reference sensor, there is a problem in that the number of the magnetic sensor element that are actually used for the detection is reduced.

SUMMARY OF THE INVENTION

The present invention has for its primary object to provide a rotation angle detecting device and a bearing assembly utilizing the same, in which the length of time required to read out the sensor signals can be reduced without the accuracy of detection of the angle being reduced, in which the angle of rotation can be accomplished at high speeds and with high precision, and which can be realized in a small size.

Another important object of the present invention is to provide a magnetic sensor array circuit, in which with no reference sensor element employed, a circuit configuration capable of reading out the sensor signal without being adversely affected by a change in environment can be realized.

The rotation angle detecting device according to a first construction of the present invention includes a magnetic generator arranged in a rotatable member and having a magnetic anisotropy in a circumferential direction around an axis of rotation; a plurality of linear magnetic sensor arrays arranged on a stationary member, confronting the magnetic generator in a direction along the rotational axis of the rotatable member; an AD converter circuit for converting respective outputs of the magnetic sensor arrays into digital signals; a zero-crossing-position detector for detecting a zero-crossing-position in a distribution of magnetic field in reference to an output of the AD converter circuit; and an angle calculator for detecting an angle of rotation of the magnetic generator in reference to the zero-crossing-position detected by the zero-crossing-position detector. It is to be noted that the term "(magnetic generator) having a magnetic anisotropy in a circumferential direction" referred to hereinabove and hereinafter is intended to speak of the connotation of a property, in which the intensity of magnetic fields in a circumferential direction varies and, therefore, when the magnetic generator is rotated, the magnetic fields at a fixed point outside the magnetic generator varies at a cycle in dependence on the rotational speed. This rotation angle detecting device also includes a detected-position storage for storing the zero-crossing-position, which is detected by the zero-crossing-position detector for each cycle of processing; a scanning range setting circuit for setting a subsequent scanning range for the magnetic sensor array at a predetermined standard on the basis of the zero-crossing-position that has been stored; and a scanning circuit for reading a detection signal of the magnetic sensor array within the scanning range set by the scanning range setting circuit. The zero-crossing-position detector is operable to detect the zero-crossing-position with use of a partial detection signal of the scanning range that is a limited part of the magnetic sensor array and the angle calculator is operable to detect the angle of rotation in reference to the zero-crossing-position detected from the partial detection signal.

According to this construction, the result of detection of the zero-crossing-position for each cycle is stored in the detected-position storage, the scanning range for the subsequent cycle is set by the scanning range setting circuit based on the zero-crossing-position stored in the detected-position storage, and the zero-crossing-position detector determines the subsequent zero-crossing-position by scanning the scanning range so set. Since the read-out of the sensor signal is carried out continuously, the zero-crossing-position detected during the subsequent scanning lies within a certain range forwardly and rearwardly of the previously detected position unless it is at an extremely high speed. For this reason, if the subsequent scanning range is properly set based on the previous zero-crossing-position, even though the scanning range is rendered to be partially limited as above, the zero-crossing-position can be detected. Thus, since only the limited scanning range is read out, the read-out time can be reduced. Although the scanning range is limited, the number of the magnetic sensor elements is not reduced, the detecting accuracy does not decrease while the read-out time is reduced. Also, since the amount of signals read out decreases, the amount of data handled by the zero-crossing-position detector correspondingly decreases, resulting in reduction of the length of time required to complete the calculation. As a result thereof, even when the number of the magnetic sensor elements forming the magnetic sensor array is many, the delay of time subsequent to the start of reading the respective outputs from the magnetic sensor arrays and up until the outputting of the result of detection of the angle can be reduced and, thus, the angle of rotation can be detected at a high speed and with high accuracy.

In the present invention, the magnetic sensor array may be arranged in four in number on a plane perpendicular to the axis of rotation so as to occupy one of four sides of an imaginary shape of a rectangle. In the case of this construction, within a region bound by the magnetic sensor arrays that are arranged to depict a rectangular layout, the signal processing circuit for processing an output from the magnetic sensor array to calculate the angle or rotation can be disposed and, therefore, when the magnetic sensor arrays and the signal processing circuit are integrated on a sensor chip, it can be constructed compact in size and the area of surface of the sensor chip occupied by circuit components can be reduced.

In the present invention, a speed and direction detector for detecting a speed and direction of rotation of the magnetic generator in reference to a result of detection of the angle by the angle calculator for each cycle may be provided, in which case the scanning range setting circuit sets a scanning range at a predetermined standard with use of the number of data used in zero crossing calculation and a shift component of the zero-crossing-position incident to a rotatory shift of the magnetic generator, based on a record on the speed and direction of rotation detected by the speed and direction detector. In the case of this construction, where the zero-crossing-position exists during the subsequent output reading can be estimated very accurately from a record made of the speed and direction of rotation and, therefore, the scanning range can be defined for the subsequent cycle by setting the starting and terminating points of the scanning range at respective locations forwards and rearwards of the estimated zero-crossing-position. In this way, the number of the magnetic sensor elements for reading out the output from the magnetic sensor array can be reduced further and the length of time required to complete the read-out and the length of time required to complete the calculating process for the detection of the zero-crossing-positions can also be reduced further.

In the present invention, the scanning circuit for scanning the magnetic sensor array may include a magnetic sensor element selecting circuit capable of simultaneously selecting a plurality of neighboring magnetic sensor elements during a signal read-out of the magnetic sensor array and is capable of sequentially scanning while simultaneously selecting the plurality of magnetic sensor elements.

According to this construction, since the sequential scanning can be made while the plural magnetic sensor elements are selected simultaneously, the detecting speed can be increased while the length of time required to complete the signal read-out is reduced. Also, where the magnetic sensor element selecting circuit is assigned to perform a magnetic sensor element selecting operation of a kind, in which some of the magnetic sensor elements overlap in the selection of the magnetic sensor elements forwardly and rearwardly during the sequential scanning, influences brought about by the sensor size can be reduced and a stable detection can be performed. Further, owing to the capability that if the plural magnetic sensor elements are selected simultaneously and scanned sequentially, the length of time required to complete the signal read-out can be reduced, where the scanning is performed a number of times, the sensor size reducing effect such as described above is effective to compensate for a degradation of the angle resolving power, which would result from reduction of the size of the magnetic sensor array. For this reason, downsizing is possible with the angle resolving power being altered and, hence, the detecting speed is high and a high detecting accuracy can be obtained, making it possible to provide the rotation angle detecting device that can be assembled compact in size.

In the present invention, preferably, the rotation angle detecting device of the present invention may further include a sensor selecting circuit for selecting the magnetic sensor elements to sequentially read out, a sensor signal read-out circuit for reading a detection signal from the selected magnetic sensor element, a short-circuiting switch provided at an input side of the sensor signal read-out circuit for creating a condition, in which two output terminals of the magnetic sensor element are short-circuited together, an offset-output storage for storing an output signal of the sensor signal read-out circuit as a reference offset during the short-circuited condition created by the short-circuiting switch, and an offset subtractor for subtracting the reference offset, stored in the offset-output storage, from the output signal of the sensor signal read-out circuit during a condition, in which short-circuiting performed by the short-circuiting switch is released.

According to this construction, through the operation to read out the sensor signal, a condition, in which the output terminals of the magnetic sensor element are short-circuited, is created and the output signal generated during this condition is outputted to the offset-output storage as a reference offset of the sensor signal read-out circuit. The offset subtractor calculates the difference with the stored reference offset when the output signal is extracted with the short-circuiting of the output terminals of the magnetic sensor element released. In this way, the offset generated in the sensor signal read-out circuit can be cancelled. For this reason, the sensor signal can be read out without being affected by a change in environment, resulting in increase of the detecting accuracy. Also, effects similar to that afforded when the reference sensor element is employed can be obtained without the reference sensor element employed, and, therefore, there is no need to use an extra reference sensor, resulting in facilitation of downsizing of the circuit space.

The rotation angle detecting device according to a second construction of the present invention includes a magnetic generator arranged in a rotatable member and having a magnetic anisotropy in a circumferential direction around the axis of rotation; a magnetic sensor array including a plurality of magnetic sensor elements and arranged on a stationary member, confronting the magnetic generator in a direction along the rotational axis of the rotatable member; an angle calculator for calculating an angle of rotation in reference to an output from the magnetic sensor array; and a scanning circuit operable to scan the magnetic sensor array and including a magnetic sensor element selecting circuit capable of simultaneously selecting a plurality of neighboring magnetic sensor elements during a signal read-out of the magnetic sensor array and capable of sequentially scanning while simultaneously selecting the plural magnetic sensor elements.

According to this construction, since by allowing the magnetic sensor element selecting circuit to simultaneously select the plural magnetic sensor elements when the signal is read out from the magnetic sensor array by the scanning circuit, the sequential scanning can be performed while the plural magnetic sensor elements are selected simultaneously, the length of time required to achieve the signal read-out can be reduced to thereby increase the detecting speed. Also, where the magnetic sensor element selecting circuit is assigned to perform a magnetic sensor element selecting operation of a kind, in which some of the magnetic sensor elements overlap in the selection of the magnetic sensor elements forwardly and rearwardly during the sequential scanning, influences brought about by the sensor size can be reduced and a stable detection can be performed. Further, owing to the capability that if the plural magnetic sensor elements are selected simultaneously and scanned sequentially, the length of time required to complete the signal read-out can be reduced, where the scanning is performed a number of times, the sensor size reducing effect such as described above is effective to compensate for a degradation of the angle resolving power, which would result from reduction of the size of the magnetic sensor array. For this reason, downsizing is possible with the angle resolving power being altered and, hence, the detecting speed is high and a high detecting accuracy can be obtained, making it possible to provide the rotation angle detecting device that can be assembled compact in size.

In the second construction of the present invention, the magnetic sensor array may include a linear array of magnetic sensor elements, which define the magnetic sensor elements, the linear array of the magnetic sensor elements being arranged in four in number on a plane perpendicular to the axis of rotation so as to occupy one of four sides of an imaginary shape of a rectangle. In the case of this construction, since the signal processing circuit for calculating the angle of rotation by processing the outputs of the magnetic sensor arrays, downsizing is possible where the magnetic sensor array and the signal processing circuit are integrated together on the sensor chip and, therefore, the surface area for the circuit elements on the sensor chip can be minimized.

In the second construction of the present invention, a device may be provided for the scanning circuit for setting from outside, the number of the magnetic sensor elements to be selected simultaneously. In the case of this construction, where the detecting speed is desired to be increased while the length of time required to complete the signal read-out is reduced, the number of the magnetic sensor elements to be selected from outside can easily be determined.

In the second construction of the present invention, a device may be provided for the scanning circuit for setting a scanning pattern from outside. In the case of this construction, where the detecting speed is desired to be increased while the length of time required to complete the signal read-out is reduced, such scanning pattern can easily be set from outside. Thus, since depending upon the purpose of application, the number of the magnetic sensor element to be selected and the scanning pattern can be variably set, the only rotation angle detecting device can be used in a number of applications one at a time.

In the second construction of the present invention, an integrating or averaging circuit may be provided for integrating or averaging sensor output signals for a plurality of cycles over which the magnetic sensor array is sequentially scanned, in which case the angle calculator operates to calculate the angle of rotation based on an integrated or averaged result. When the scanning is performed a number of times and the sensor signals resulting from the number of times of scanning are integrated or averaged, the noises of the sensor signal read out can be reduced.

The magnetic sensor array circuit of the present invention for processing an output of a magnetic sensor array including magnetic sensor elements arranged in an array, includes a sensor selecting circuit for selecting the magnetic sensor elements to read out sequentially; a sensor signal read-out circuit for reading a detection signal from the selected magnetic sensor element; a short-circuiting switch provided at an input side of the sensor signal read-out circuit for creating a condition, in which two output terminals of the magnetic sensor element are short-circuited together; an offset-output storage for storing an output signal of the sensor signal read-out circuit as a reference offset during a short-circuited condition created by the short-circuiting switch; and an offset subtractor for subtracting the reference offset, stored in the offset-output storage, from the output signal of the sensor signal read-out circuit during a condition, in which short-circuiting performed by the short-circuiting switch is released.

According to this construction, through the operation to read out the sensor signal, a condition, in which the output terminals of the magnetic sensor element are short-circuited, is created and the output signal generated during this condition is outputted to the offset-output storage as a reference offset of the sensor signal read-out circuit. The offset subtractor calculates the difference with the stored reference offset when the output signal is extracted with the short-circuited condition of the output terminals of the magnetic sensor element opened. In this way, the offset generated in the sensor signal read-out circuit can be cancelled. For this reason, the sensor signal can be read out without being affected by a change in environment, resulting in increase of the detecting accuracy. Also, effects similar to that afforded when the reference sensor element is employed can be obtained without the reference sensor element employed, and, therefore, there is no need to use an extra reference sensor, resulting in facilitation of downsizing of the circuit space.

In the magnetic sensor array circuit of the present invention, an offset-processing controller may be provided for performing for each reading operation of the magnetic sensor elements of the sensor signal read-out circuit, a sequence of short-circuiting by the short-circuiting switch, storage of the reference offset by the offset-output storage, release of the short-circuiting of the short-circuiting switch and subtraction by the offset subtractor during a condition, in which the short-circuiting is released.

When the above described sequence of operation is performed during the operation to read out the magnetic sensor elements, the signal of the magnetic sensor array can be extracted without being adversely affected by the drift and offset of the sensor signal read-out circuit.

In the case of this construction, a current-to-voltage converting circuit may be provided for converting a current signal, detected by the sensor signal read-out circuit, into a voltage signal by means of an integrating circuit utilizing a switch and a capacitor, in which case the offset-processing controller is operable to switch the switch so that the switch can switch a current accumulating path towards the capacitor of the integrating circuit and so that an accumulating operation for a predetermined length of time including accumulation of the reference offset and accumulation of the sensor signal can be performed two times in total for each reading operation of the magnetic sensor elements, electric charges obtained respectively through those accumulating operations being counterbalanced with each other.

If as described above, the circuit for converting the current, detected by the sensor signal read-out circuit, into a voltage signal is constituted by the integrated circuit utilizing the capacitor, the offset can be cancelled simultaneously with conversion into the voltage. Because of this, the circuit can be simplified and the space can also be saved, resulting in suppression of the manufacturing cost.

The rotation angle detecting device equipped bearing assembly of the present invention is of a type equipped with a rotation angle detecting device according to any one of the foregoing constructions. In such case, the magnetic generator is arranged on a rotatable raceway member, which is a rotatable member, whereas the magnetic sensor array is arranged on a stationary raceway member, which is a stationary member.

When the rotation angle detecting device is integrated with the bearing assembly in this way, the number of component parts of a machine or equipment utilizing the bearing assembly and the number of assembling steps can be reduced and downsizing is also achieved. In such case, since the rotation angle detecting device is capable of accomplishing the detection of the angle of rotation at a high speed and with high accuracy, the angle of rotation can be achieved with high precision even if it is used in association with a bearing assembly of a machine that rotates at a high speed or in association with a bearing assembly used in a control system that requires a high speed response.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
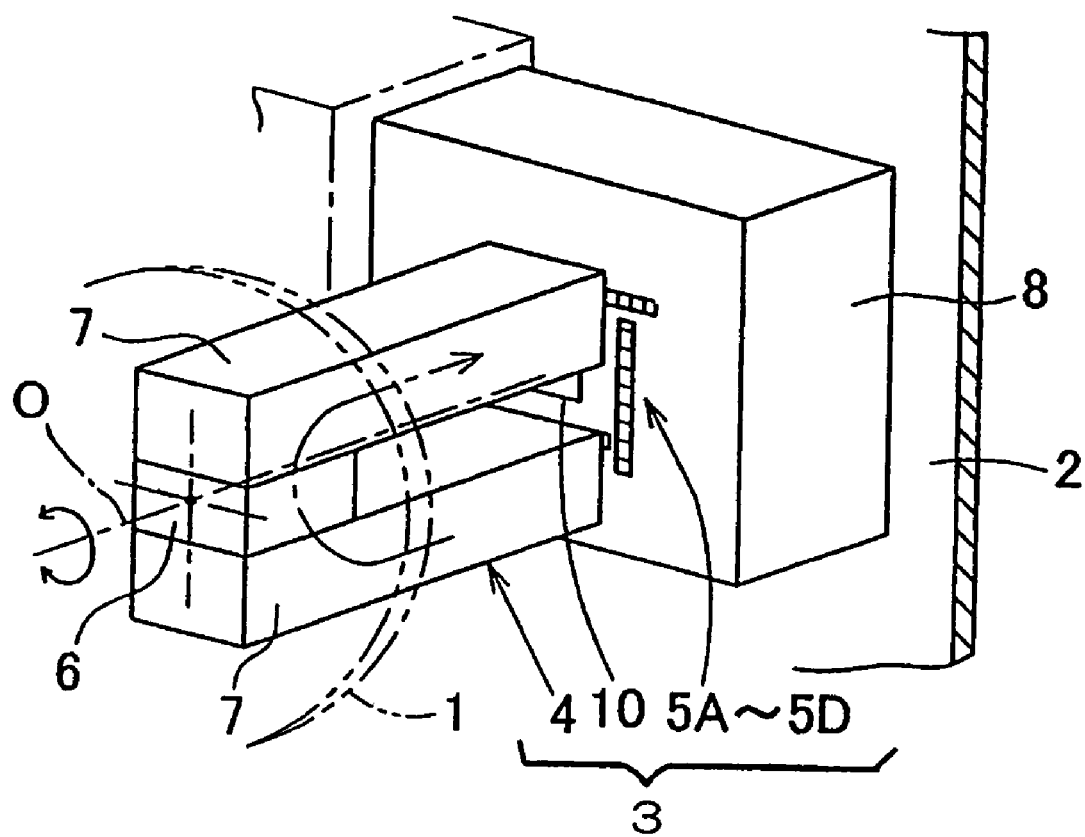
FIG. 1 is a perspective view showing a schematic construction of a rotation angle detecting device according to a first preferred embodiment of the present invention.

A first preferred embodiment of the present invention will be described in detail. FIG. 1 illustrates a schematic structure of a rotation angle detecting device according to the first embodiment of the present invention. A rotation angle detecting device 3 includes a rotatable member 1 and a stationary member 2 representing a member on a rotatable side and a member on a stationary side, which are rotatable relative to each other. The rotation angle detecting device 3 further includes a magnetic generator 4 arranged on the rotatable member 1, four linear arrays 5A, 5B, 5C and 5D of magnetic sensors arranged on the stationary member 2, and a signal processing circuit 10 for processing respective outputs from those linear magnetic sensor arrays 5A to 5D to calculate the angle of rotation.

The magnetic generator 4 is of a type capable of generating magnetism having a magnetic anisotropy in a circumferential direction around an axis of rotation O of the rotatable member 1 and is in the form of a single body of permanent magnet or a composite body comprised of a permanent magnet and a magnetic material. In the illustrated embodiment, the magnetic generator 4 includes a single permanent magnet 6 sandwiched between two yokes 7 and 7 of a magnetic material and then integrated together to represent a generally forked configuration, with one of the magnetic yokes 7 representing a N-pole at one end thereof and with the other of the magnetic yokes 7 representing an S-pole at one end thereof. By constructing the magnetic generator 4 in this way, it can be constructed simple and robust. This magnetic generator 4 is fitted to the rotatable member 1 with the axis of rotation O of the rotatable member 1 aligned with the longitudinal axis of the magnetic generator 4, so that the N-pole and the S-pole can turn around the above mentioned axis of rotation O when the rotatable member 1 is rotated.

Figure 3:
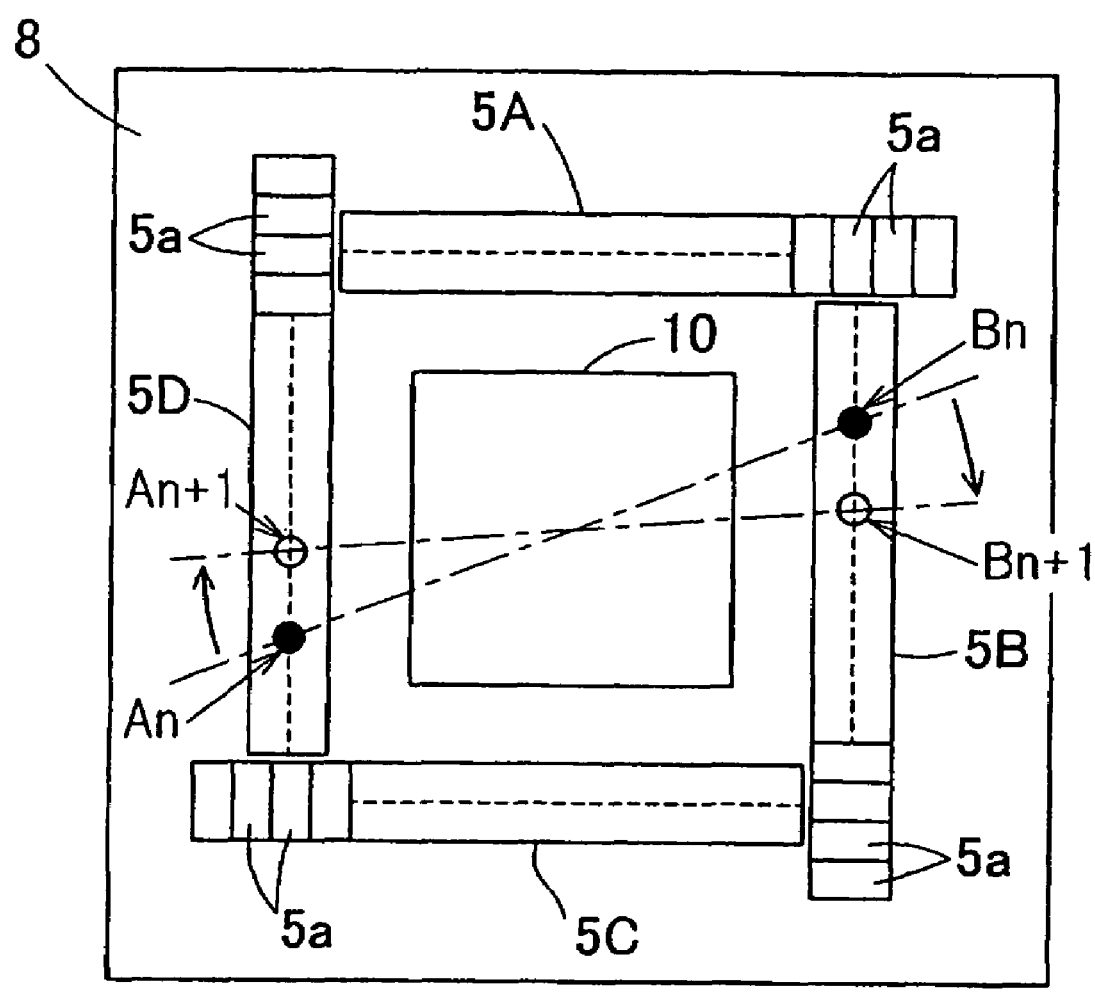
FIG. 3 is an explanatory diagram showing an example of zero-crossing-position on the magnetic sensor arrays.

The magnetic sensor arrays 5A to 5D are used to detect magnetism, that is, the presence of magnetic fields generated from the magnetic generator 4 and are arranged on the stationary member 2 so as to be held in face-to-face relation with the magnetic generator 4 in a direction along the axis of rotation O of the rotatable member 1. As shown in FIG. 3, each of the magnetic sensor arrays 5A to 5D includes a plurality of magnetic sensor elements 5a arranged in line and is arranged on a plane perpendicular to the axis of rotation O of the rotatable member 1 so as to occupy a position corresponding to one of four sides of the imaginary shape of a rectangle. In such case, the geometric center of the imaginary rectangular shape is aligned with the axis of rotation O of the rotatable member 1. The magnetic sensor arrays 5A to 5D so configured as hereinabove described are formed on one of opposite surfaces of a semiconductor chip 8, fitted to the stationary member 2, which confronts the magnetic generator 4.

Figure 2:
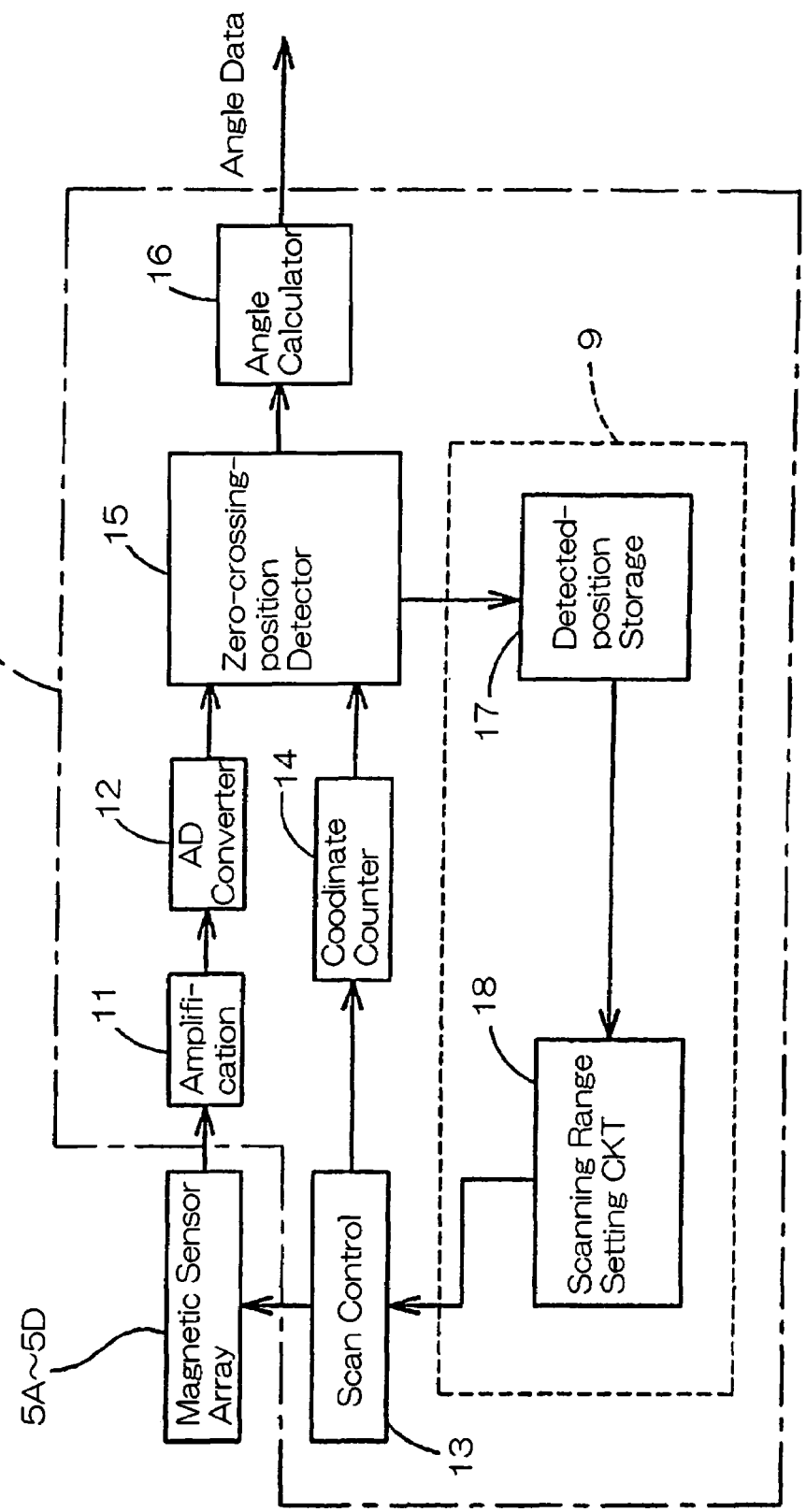
FIG. 2 is a block circuit diagram showing a first circuit configuration of a signal processing circuit and a magnetic sensor array of the rotation angle detecting device in FIG. 1, which are formed on a semiconductor chip.

FIG. 2 is a block circuit diagram illustrating the magnetic sensor arrays 5A to 5D and a schematic structure of a signal processing circuit 10 for processing respective outputs from the magnetic sensor arrays 5A to 5D to calculate the angle of rotation. The signal processing circuit 10 is integrated on the semiconductor chip 8 together with the magnetic sensor arrays 5A to 5D. In such case, as shown in FIG. 3, the signal processing circuit 10 is arranged inside a region bound by the magnetic sensor arrays 5A to 5D that are arranged to depict a rectangular layout. By so doing, the magnetic sensor arrays 5A to 5D and the signal processing circuit 10 can be arranged compactly on the semiconductor chip 8 and, hence, the surface area of the semiconductor chip 8 occupied by circuit elements can be minimized.

Referring to FIG. 2, a signal amplifying circuit 11, an analog-to-digital (AD) converter circuit 12, a scan control circuit 13 and an coordinate counter 14 are employed for each of the magnetic sensor arrays 5A to 5D. The signal amplifying circuit 11 is operable to amplify an output from the corresponding magnetic sensor array 5A to 5D, and the AD converter circuit 12 is operable to convert a signal, which has been amplified by the signal amplifying circuit 11, into a digital signal. The scan control circuit 13 is operable to control scanning and reading out the output from the corresponding magnetic sensor array 5A to 5D.

By way of example, the magnetic sensor array 5A is scanned sequentially to read out an output under the control of the corresponding scan control circuit 13 and is then amplified by the corresponding signal amplifying circuit 11, from which the amplified signal is, after having been converted into a digital signal by the corresponding AD converter circuit 12, supplied to a zero-crossing-position detector 15. Also, the scan control circuit 13 transmits information on the location of sequence of the magnetic sensor element 5a selected in the scanning control of the magnetic sensor array 5A to the coordinate counter 14. In response to the location of sequence information transmitted from the scan control circuit 13, the coordinate counter 14 supplies information on the coordinate of the selected magnetic sensor element 5a to the zero-crossing-position detector 15. Accordingly, in the zero-crossing-position detector 15, respective sensor signals from the magnetic sensor elements 5a, which are successively inputted from the AD converter circuit 12 as a digital signal, and coordinate information inputted from the coordinate counter 14 are associated with each other. The zero-crossing-position detector 15 is employed one for all of the magnetic sensor arrays 5A to 5D and, hence, respective outputs from the other magnetic sensor arrays 5B to 5D are similarly supplied to the zero-crossing-position detector 15, where they are associated with the coordinate information. The zero-crossing-position detector 15 is operable to detect the zero-crossing-position in a distribution of magnetic fields, generated by the magnetic generator 4, in reference to the respective outputs from the magnetic sensor arrays 5A to 5D. In FIG. 3, zero-crossing-positions detected by the zero-crossing-position detector 15 for an arbitrary cycle of signal reading are shown by An and Bn. An angle calculator 16 shown in FIG. 2 is operable to calculate the rotation angle of the magnetic generator 4 on the basis of the zero-crossing-positions detected by the zero-crossing-position detector 15.

The signal processing circuit 10 referred to above additionally includes a detected-position storage 17 and a scanning range setting circuit 18. The detected-position storage 17 is a circuit for storing zero-crossing-positions, which are a result of the process for each occasion, including read-out of the respective outputs from the magnetic sensor arrays 5A to 5D and detection by the zero-crossing-position detector 15. The scanning range setting circuit 18 is operable to set a scanning range to be scanned by the magnetic sensor arrays 5A to 5D during the subsequent occasion at a predetermined standard based on the previous zero-crossing-position stored in the detected-position storage 17.

Figure 4:
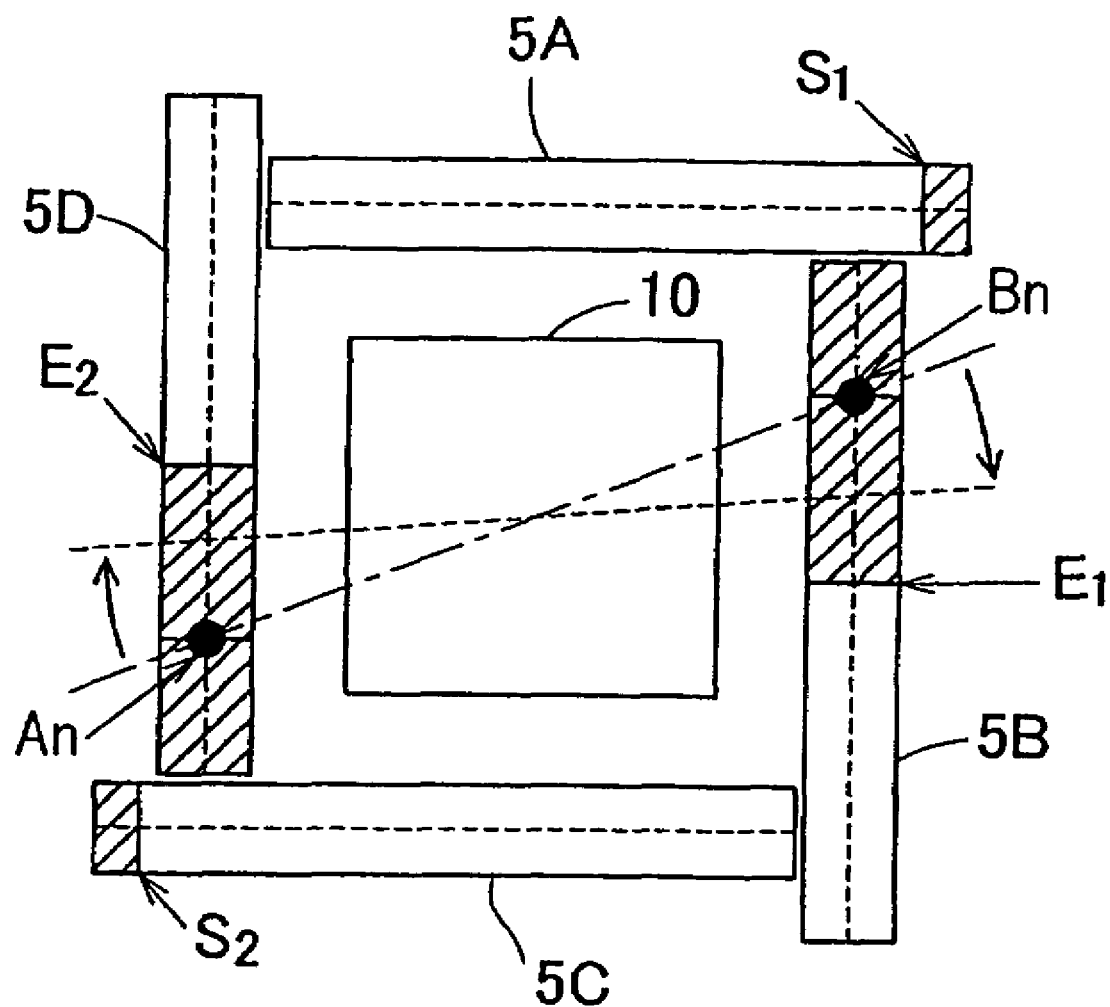
FIG. 4 is an explanatory diagram showing an example of scanning ranges set on the magnetic sensor arrays, which is applicable in the case of the 1st circuit configuration.

Hereinafter, the operation of a circuit section 9 of the signal processing circuit 10 shown in FIG. 2, which includes the detected-position storage 17 and the scanning range setting circuit 18 as encompassed by the broken line, will be described. Since reading of the sensor signal by the scan control circuit 13 is performed repeatedly at intervals of a particular cycle, if the magnetic generator 4 is rotated clockwise, not at a very high speed, it can be estimated that during the signal reading and detecting process subsequent to the previous signal reading and detecting process, during which the zero-crossing-positions shown by An and Bn in FIG. 3 have been detected, the zero-crossing-positions, shifted a predetermined amount from the previously detected zero-crossing-positions An and Bn along the magnetic sensor arrays 5D and 5B, would be detected as indicated by An+1 and Bn+1 in FIG. 3. Accordingly, the scanning range setting circuit 18 referred to above sets the scanning range for the subsequent signal reading as follows, based on the previously detected zero-crossing-positions An and Bn stored in the detected-position storage 17. Namely, as shown in FIG. 4, in the region of arrangement of the magnetic sensor arrays 5A to 5D, which are arranged in a rectangular pattern, predetermined forward and rearward ranges S1 to E1 of the one of the previously zero-crossing-positions, that is, the previous zero-crossing-position Bn, and predetermined forward and rearward ranges S2 to E2 of the other of the previous zero-crossing-positions, that is, the previous zero-crossing-position An, are set as respective scanning ranges. More specifically, with respect to the scanning ranges S1 to E1 based on the previous zero-crossing-position Bn, the starting point S1 and the terminating point E1 thereof are set as follows, using a predetermined fixed value Δ:

$S1 = Bn - \Delta$ $E1 = Bn + \Delta$

Also, with respect to the scanning ranges S2 to E2 based on the previous zero-crossing-position An, the starting point S2 and the terminating point E2 thereof are set as follows, using the predetermined fixed value Δ:

$S2 = An - \Delta$ $E2 = An + \Delta$

In this way, by setting the subsequent scanning range, it is possible to render the zero-crossing-positions An+1 and Bn+1, which are estimated to be detected subsequently, to be assuredly encompassed within the subsequent scanning range.

The scanning control performed by the scan control circuit 13 during the subsequent reading of the respective outputs from the magnetic sensor arrays 5A to 5D is performed in the limited scanning ranges S1 to E1 and S2 to E2 so set as hereinabove described, the length of time required to complete the reading can be reduced. Also, since the signal amount to be read out is reduced, the data handled by the zero-crossing-position detector 15 becomes so small in quantity that the length of time required to complete the calculation can also be reduced.

Figure 5:
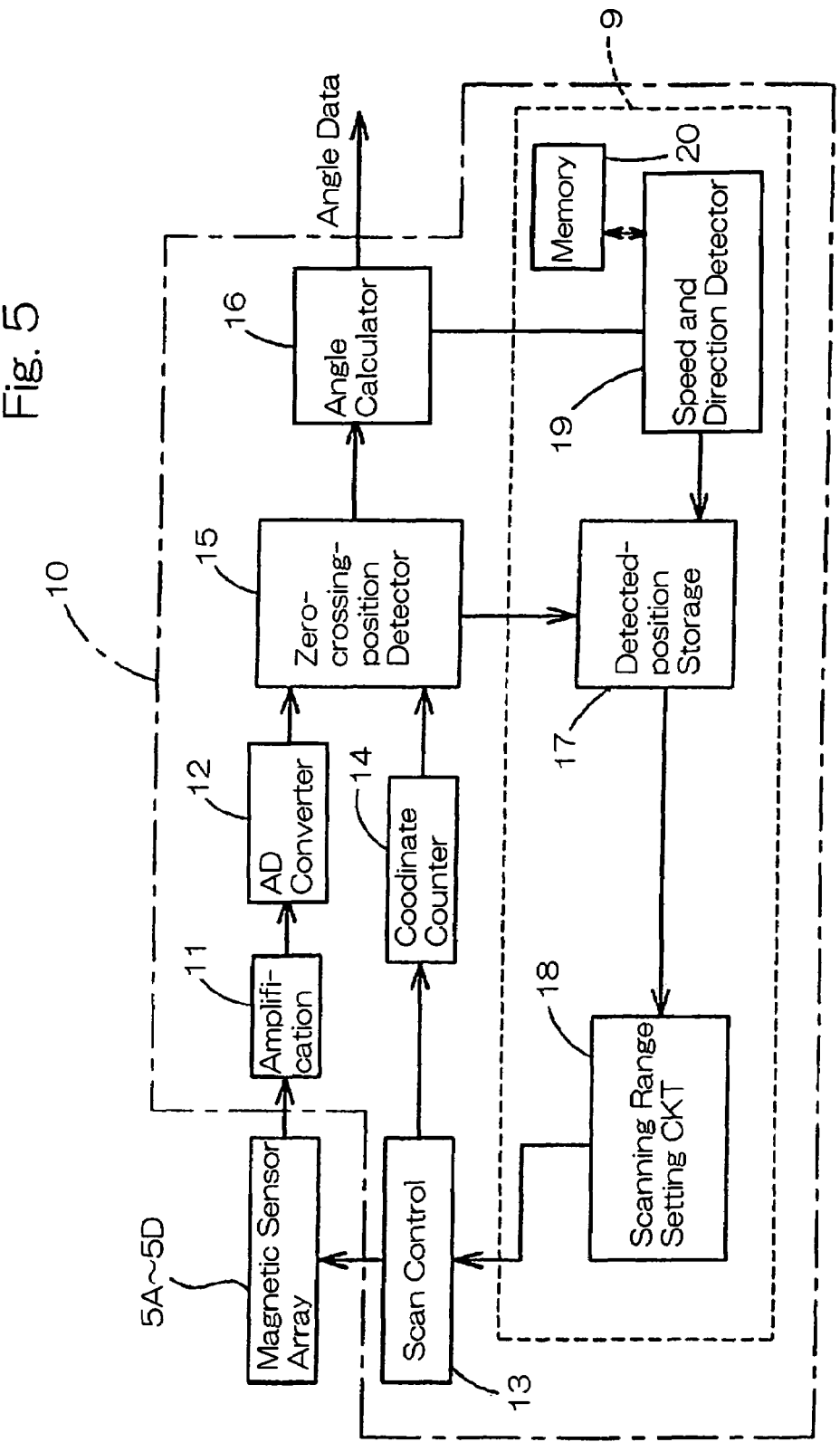
FIG. 5 is a block circuit diagram showing a second circuit configuration of the signal processing circuit and the magnetic sensor array on the semiconductor chip.

FIG. 5 illustrates a second circuit configuration of the signal processing circuit 10. This second circuit configuration is similar to the first circuit configuration shown in FIG. 2 and described hereinabove, except that it further includes a speed and direction detector 19 for detecting the speed and direction of rotation of the magnetic generator 4 from the result of the detected angle given by the angle calculator 16 for each cycle, and a memory 20 for storing data on the detected speed and direction of rotation. Also, in the case of this second circuit configuration, the scanning range setting circuit 18 is so designed as to make use of the number of data used in calculating the zero-crossing-positions and the amount of shift of the zero-crossing-positions resulting from the rotary shift of the magnetic generator 4 to set the scanning ranges at the predetermined standard on the basis of the speed and direction of rotation that have been detected by the speed and direction detector 19.

Figure 6:
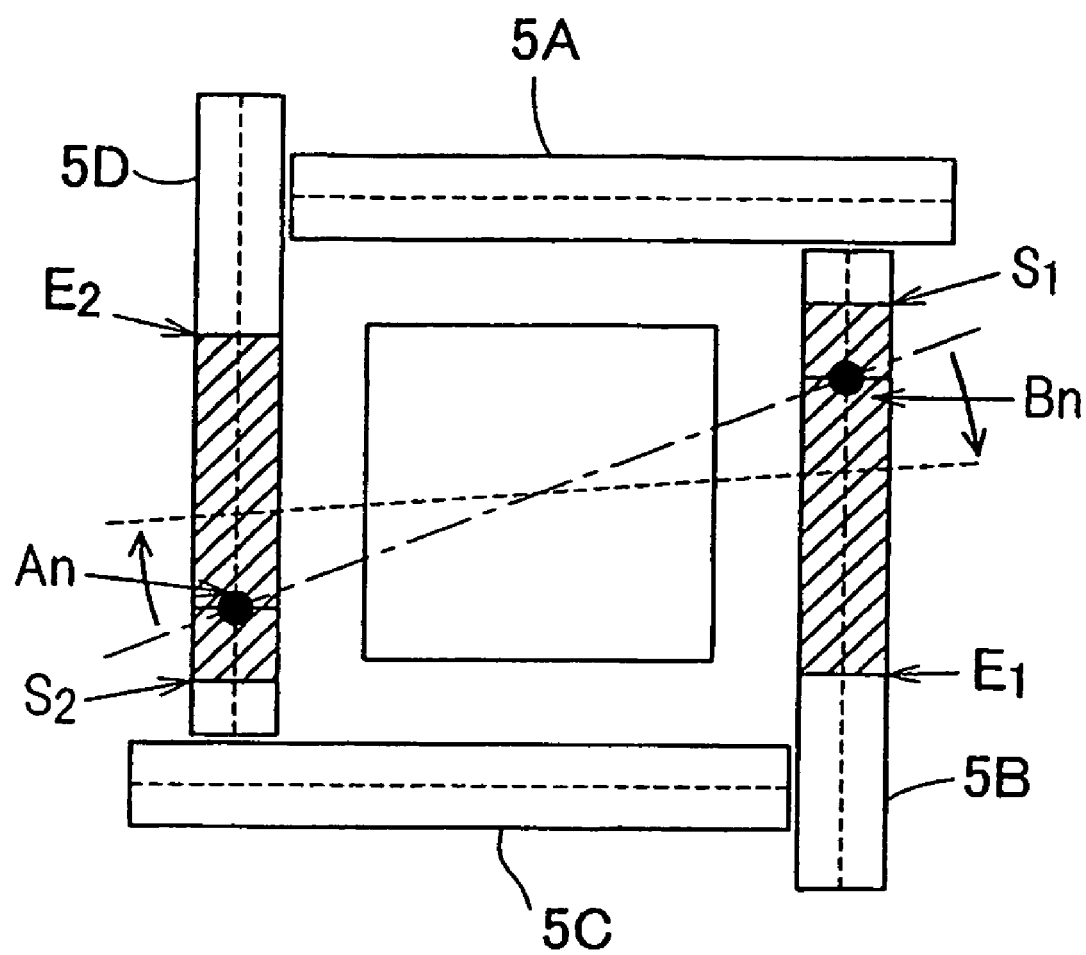
FIG. 6 is an explanatory diagram showing an example of scanning ranges set on the magnetic sensor arrays, which is applicable in the case of the 2nd circuit configuration.

FIG. 6 illustrates an example of the subsequent scanning ranges S1 to E1 and S2 to E2 set where the signal processing circuit 10 of the circuit configuration shown in FIG. 5 is employed. Similarly to the previous case, it is assumed that the magnetic generator 4 rotates in the clockwise direction. In such case, where the zero-crossing-positions (the NS boundary line of the corresponding magnetic distribution is shown by the broken line in FIG. 6.) exist during the subsequent output reading can be estimated very accurately based on a record made of the speed and direction of rotation and, therefore, the scanning ranges S1 to E1 and S2 to E2 are defined for the subsequent cycle by setting the starting and terminating points of the scanning range at respective locations forwards and rearwards of the estimated zero-crossing-positions.

In this way, the number of the magnetic sensor elements 5a for reading out the respective outputs from the magnetic sensor arrays 5A to 5D can be reduced further and the length of time required to complete the read-out and the length of time required to complete the calculating process for the detection of the zero-crossing-positions can also be reduced further.

It is to be noted that in the case of the circuit configuration shown in FIG. 5, a component or device may be provided for outputting the result of detection of the speed and direction of rotation, detected by the speed and direction detector 19, to an external element. In such case, the speed and direction of rotation of the magnetic generator 4 can be informed to the external element on a real time basis.

Figure 7:
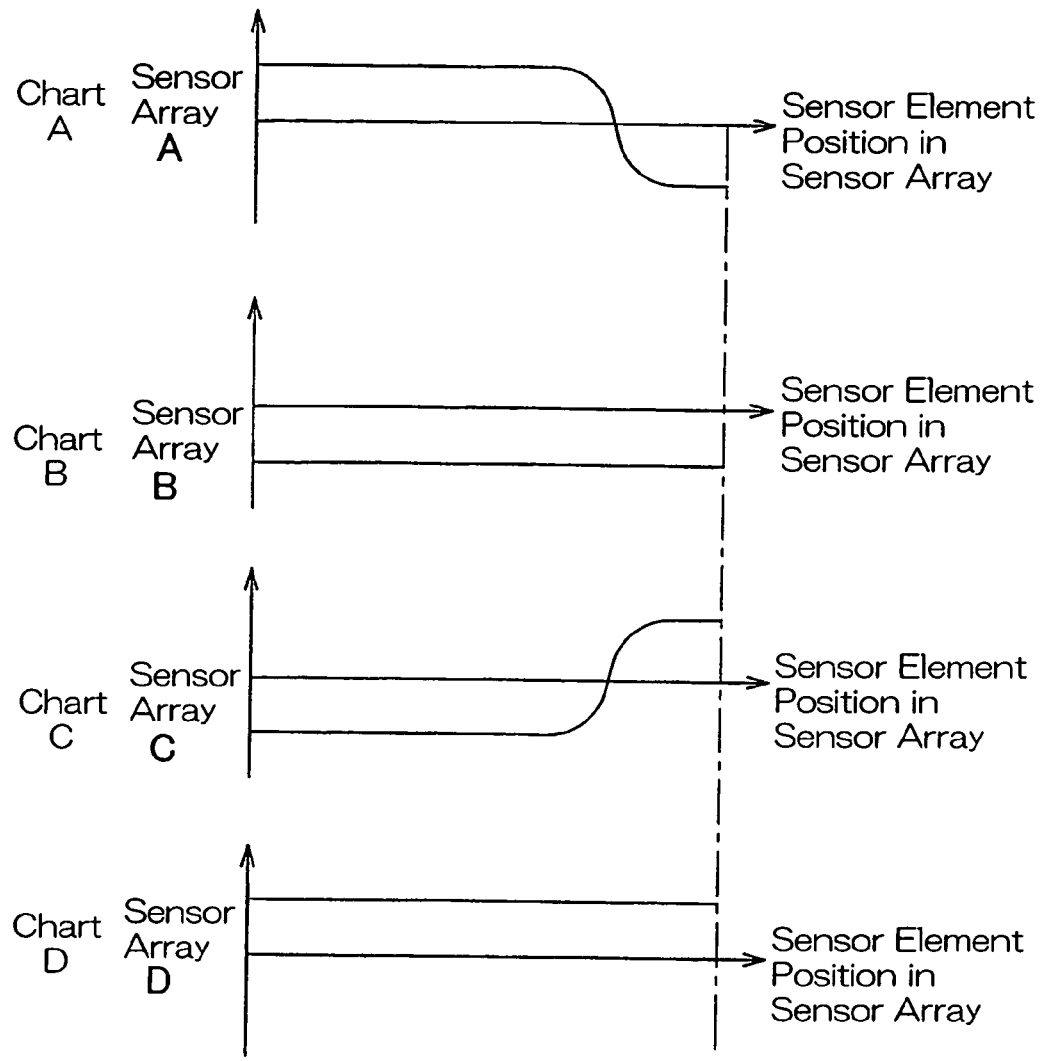
FIG. 7 is a chart showing waveforms of respective signals outputted from magnetic sensor arrays.
Figure 8:
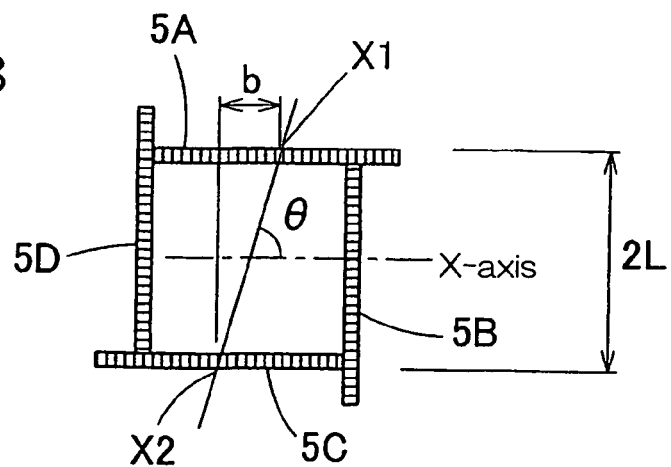
FIG. 8 is an explanatory diagram used to explain a process of calculating the angle by means of an angle calculator.

FIGS. 7 and 8 are explanatory diagrams used to explain the angle calculating process performed by the angle calculator 16. Charts A to D in FIG. 7 illustrate respective waveforms of the outputs generated from the magnetic sensor arrays 5A to 5D when the rotatable member 1 undergoes rotation, in which the axis of abscissa represents the position of arrangement of the magnetic sensor elements 5a of each of the magnetic sensor arrays 5A to 5D and the axis of ordinate represents the intensity of the detected magnetic field.

Let it be assumed that the zero-crossing-positions, which is the boundary between the N-pole and S-pole of the magnetic generator 4, lie at respective positions X1 and X2 shown in FIG. 8. In this condition, the outputs from those magnetic sensor arrays 5A to 5D exhibit the respective signal waveforms shown in the charts A to D. Accordingly, the zero-crossing-positions X1 and X2 can be calculated by collinear approximation of the respective outputs from the magnetic sensor arrays 5A to 5D.

The calculation of the angle can be performed by the use of the following equation:

$$\theta = \tan^{-1}(2L/b) \quad (1)$$

In this equation (1) above, $\theta$ is a value of the angle of rotation of the magnetic generator 4 expressed by the absolute angle where 2L represents the length of one side of each of the magnetic sensor array 5A to 5D that are arranged in the rectangular pattern, and b represents the length between the zero-crossing-positions X1 and X2 as measured in a transverse direction.

Where the zero-crossing-positions X1 and X2 lie in the magnetic sensor arrays 5B and 5D, respectively, the angle of rotation $\theta$ can be calculated in a manner similar to that described above, using the data on the zero-crossing-positions obtained from the respective outputs of the magnetic sensor arrays 5B and 5D.

In this way, since in the rotation angle detecting device 3, the angle of rotation is calculated in reference to the zero crossings of the distribution of magnetic fields, the detecting accuracy can be increased. Also, since information on the angle is acquired from the pattern of the magnetic fields, no axial alignment of the rotation angle detecting device 3 is required, facilitating the mounting.

In particular, with this rotation angle detecting device 3, the zero-crossing-positions, which is a result of the previous processing, are stored in the detected-position storage 17 and, using the zero-crossing-positions so stored, the ranges of the subsequent scanning of the magnetic sensor arrays 5A to 5D are set by the scanning range setting circuit 18 at the predetermined standard. The scanning control to read out the detection signals of the magnetic sensor arrays 5A to 5D within those scanning ranges is carried out by the scan control circuit 13. Thus, since using the partial detection signals of the scanning range that are limited parts of the magnetic sensor arrays 5A to 5D, the subsequent zero-crossing-positions are detected by the zero-crossing-position detector 15 and, based on the zero-crossing-positions so detected, the angle of rotation is calculated by the rotational angle calculator 16, the length of time required to complete the read-out can be reduced. Additionally, since the signal amount to be read out is reduced, the data handled by the zero-crossing-position detector 15 becomes so small in quantity that the length of time required to complete the calculation can also be reduced. As a result thereof, even where the large number of the magnetic sensor elements 5a forming each of the magnetic sensor arrays 5A to 5D is employed, the delay of time subsequent to the start of reading the respective outputs from the magnetic sensor arrays 5A to 5D and up until the outputting of the result of detection of the angle can be reduced and the angle of rotation can be detected at a high speed and with high accuracy.

Figure 9:
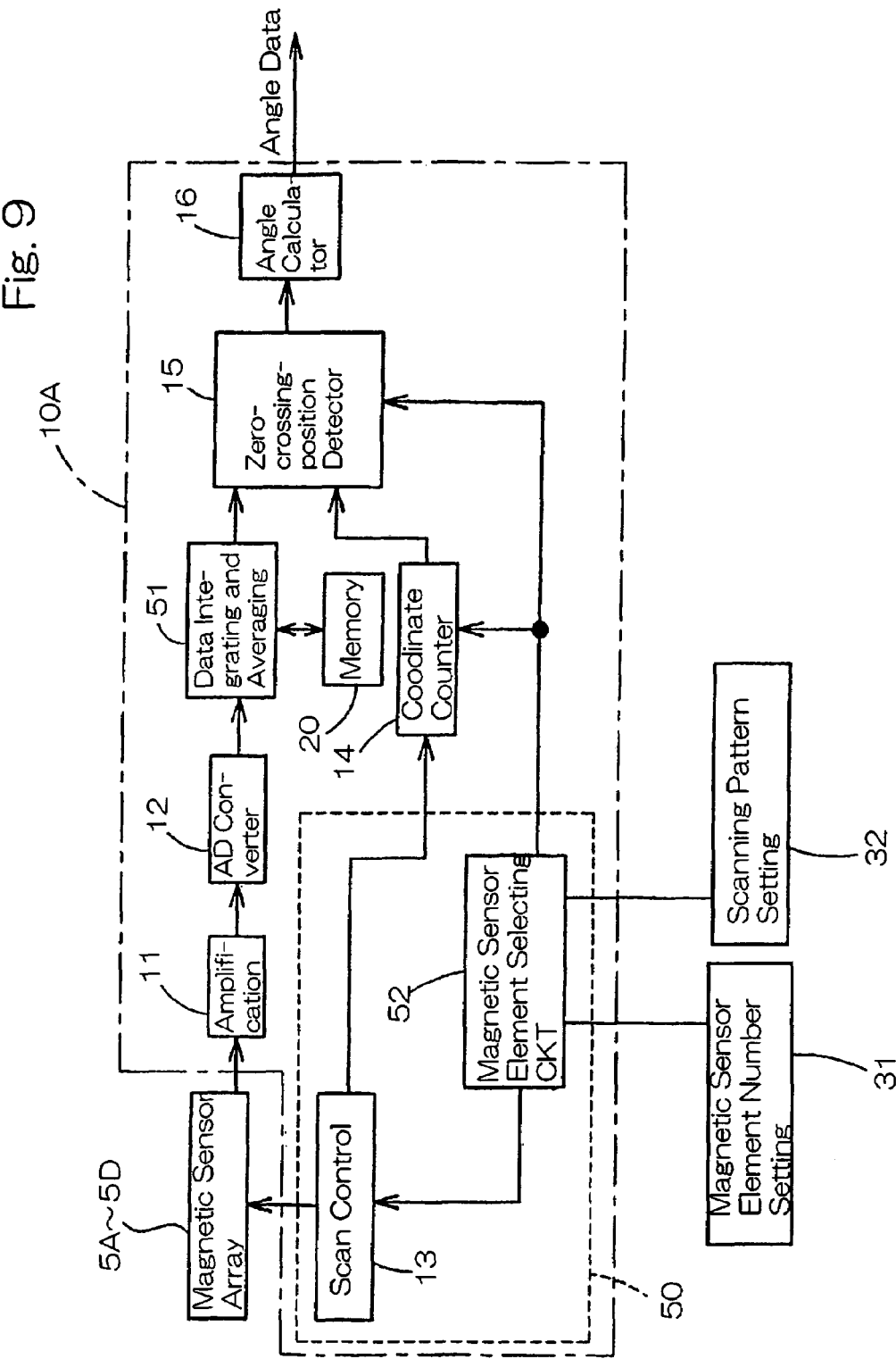
FIG. 9 is a block circuit diagram showing an example of a circuit configuration of the signal processing circuit and the magnetic sensor array employed in the rotation angle detecting device according to a second preferred embodiment of the present invention.

With particular reference to FIG. 9, the circuit configuration of the signal processing circuit and the magnetic sensor arrays employed in the rotation angle detecting device according to a second preferred embodiment of the present invention will now be described. The block circuit diagram shown therein illustrates a schematic structure including the magnetic sensor arrays 5A to 5D and the signal processing circuit 10A for processing the respective outputs from those magnetic sensor arrays 5A to 5D to calculate the angle of rotation. The signal processing circuit 10A is integrated on the semiconductor chip 8, shown in FIG. 1, together with the magnetic sensor arrays 5A to 5D. In such case, the signal processing circuit 10A is arranged inside a region bound by the magnetic sensor arrays 5A to 5D that are arranged in the rectangular pattern. By so doing, the magnetic sensor arrays 5A to 5D and the signal processing circuit 10A can be arranged compactly on the semiconductor chip 8 and, hence, the area of surface of the semiconductor chip 8 occupied by circuit elements can be minimized. In FIG. 9, a scanning circuit 50, a signal amplifying circuit 11, an AD converter circuit 12, a data integrating and averaging circuit 51, a memory 20 and a coordinate counter 14 are employed for each of the magnetic sensor arrays 5A to 5D. The scanning circuit 50 is operable to scan and read out the respective output from the corresponding magnetic sensor array 5A to 5D. The signal amplifying circuit 11 is operable to amplify the output from the corresponding magnetic sensor array 5A to 5D, which has been read out, and the AD converter circuit 12 is operable to convert the signal, amplified by the signal amplifying circuit 11, into a digital signal. The data integrating and averaging circuit 51 and the memory 20 are an optional circuit element which may be employed as desired, the details of which are not herein described.

Figure 10:
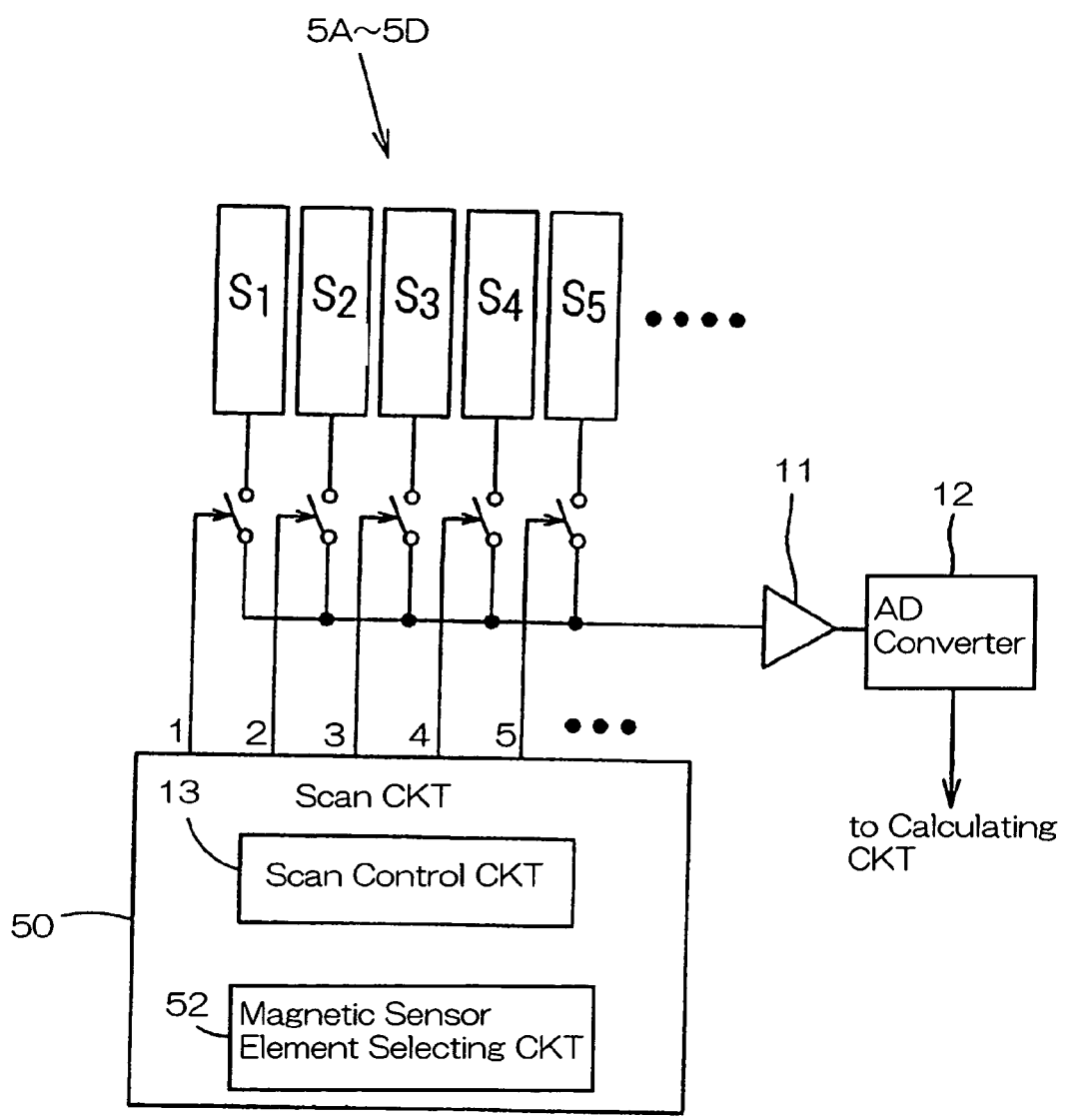
FIG. 10 is a block circuit diagram showing the manner of connecting the magnetic sensor arrays and a scanning circuit with each other in the circuit configuration of FIG. 9.

The scanning circuit 50 referred to above includes a scan control circuit 13 for controlling the scanning thereof, and a magnetic sensor element selecting circuit 52 capable of enabling a scanning method of simultaneously selecting a plurality of the magnetic sensor elements 5a at the time the signal is read out from the magnetic sensor array 5A to 5D. FIG. 10 schematically shows the manner in which the scanning circuit 50 and each of the magnetic sensor arrays 5A to 5D are connected with each other. More specifically, the magnetic sensor element selecting circuit 52 selects, for example, neighboring two magnetic sensor elements of the corresponding magnetic sensor array 5A to 5D simultaneously during one cycle of magnetic sensor element selecting operation and activates the scan control circuit 13 based on the selection information. In this way, the scanning circuit 50 can scan the magnetic sensor elements S of the corresponding magnetic sensor array 5A to 5D in the sequence of S1+S2, S3+S4, S5+S6 and so on. In other words, neighboring pluralities of, for example, two in this instance, magnetic sensor elements 5a, that are arranged as the magnetic sensor elements forming each of the magnetic sensor arrays 5A to 5D, are taken as a set of parallel connected magnetic sensor elements and, during the signal read-out, the sets of the magnetic sensor elements are sequentially scanned. Respective output signals of the plural magnetic sensor elements simultaneously selected for each cycle are summed together; the sum signal thereof is inputted to the signal amplifying circuit 11; the amplified signal is then converted into a digital data by the AD converter circuit 12; and the digital signal from the AD converter circuit 12 is, optionally after having been processed through the data integrating and averaging circuit 51 if the data integrating and averaging circuit 51 is employed, inputted to the zero-crossing-position detector 15.

As hereinabove described, simultaneous selection of the plural magnetic sensor elements 5a by means of the reading scan of the magnetic sensor arrays 5A to 5D using the scanning circuit 50 results in increase to the number of the magnetic sensor elements 5a that are connected in parallel with each other and, therefore, noises generated by the magnetic sensor elements 5a can be averaged to provide a noise reducing effect.

As another example of selection of the magnetic sensor elements by means of the magnetic sensor element selecting circuit 52, the neighboring three magnetic sensor elements may be simultaneously read out in such a sequence as S1+S2+S3, S4+S5+S6 and so on. In such case, the number of the magnetic sensor elements 5a that are connected in parallel with each other increases further and, therefore, the noise reducing effect can be correspondingly increased. Also, the number of the magnetic sensor elements to be read out decreases down to ⅓.

As a further example of selection of the magnetic sensor elements by means of the magnetic sensor element selecting circuit 52, the magnetic sensor elements selected during the previous cycle and the magnetic sensor element to be selected during the subsequent cycle may overlap partly in such a sequence as S1+S2, S2+S3, S3+S4 and so on. Even in this case, since the number of the magnetic sensor elements 5a that are connected in parallel with each other increases, the noise reducing effect can be appreciated, but the number of the magnetic sensor element to be read out does not alter so much.

As described above, since depending on the magnetic sensor element selecting method performed by the magnetic sensor element selecting circuit 52, there is the case, in which the detecting speed can be increased by reducing the length of time required to read out the signal, and the case, in which the detection can be performed stably by reducing the influence brought about by the noises although it is not possible to reduce the length of time required to read out the signal. Consequently, this embodiment makes use of a magnetic sensor element number setting circuit 31 and a scanning pattern setting circuit 32, both of which are provided outside the signal processing circuit 9 and capable of setting the magnetic sensor element selecting method, performed by the magnetic sensor element selecting circuit 52, from outside by means of a communication. The magnetic sensor element number setting circuit 31 is operable to set the number of the magnetic sensor elements that are to be read out simultaneously and, on the other hand, the scanning pattern setting circuit 32 is operable to select and set the overlap of the magnetic sensor elements descried above and to select and set the extent to which the overlap is made. Those settings, when memorized in an nonvolatile memory incorporated in, for example, the sensor element selecting circuit 52, allows the magnetic sensor element selecting method, which is to be performed by the magnetic sensor element selecting circuit 52 simultaneously upon power-on, to be set in advance. It is to be noted that since the relation between the sensor signal to be read out and the coordinate changes if the magnetic sensor element selecting method performed by the magnetic sensor element selecting circuit 52 changes, the magnetic sensor element selecting circuit 52 is designed to perform the control on the operation of the coordinate counter 14 in correspondence with the magnetic sensor element selecting circuit 52.

In this way, where the length of time required to read out the signal is desired to be reduced to increase the detecting speed, the magnetic sensor element selecting method, in which the plural magnetic sensor elements are simultaneously selected and read out by the magnetic sensor element number setting circuit 31, can be set in the magnetic sensor element selecting circuit 52, while where the influence brought about by the noises is desired to be reduced to achieve the stable detection, the magnetic sensor element selecting method, in which the plural magnetic sensor elements are selected redundantly and read out, can be set in the magnetic sensor element selecting circuit 52. Thus, since depending on the purpose of application, the number of the magnetic sensor elements selected and the scanning pattern can be variably set, the only rotation angle detecting device 3 can be used in a number of applications one at a time.

Alternatively, since the length of time required to read out can be reduced if in the magnetic sensor element selecting method performed by the magnetic sensor element selecting circuit 52, the plural magnetic sensor elements are selected and are then sequentially scanned, the length of time so saved may be used for scanning a number of times. In other words, in the simultaneous selection of the plural magnetic sensor elements in the sequence of S1+S2, S3+S3, S5+S6 and so on, for example, the plural magnetic sensor elements may be read out in the sequence of S1+S2, S1+S2, S3+S4, S3+S4 and so on. The data integrating and averaging circuit 51 in the signal processing circuit 10A shown in FIG. 9 is a circuit operable to integrate or average the sensor signals for a plurality of cycles, particularly where the scanning is performed a number of times as described above. The memory 20 is used to temporarily store the sensor signal resulting from each scanning. Thus, when the sensor signals resulting from the number of times of scanning are integrated or averaged, the noises of the sensor signal read out can be reduced.

Where as is the case with the rotation angle detecting device 3 according to the second embodiment, the four magnetic sensor arrays 5A to 5D are arranged so as to occupy respective sides of the imaginary shape of the rectangle, reduction in size of the magnetic sensor arrays 5A to 5D leads to reduction of the surface area of the semiconductor chip 8 and then to reduction of the cost of manufacturing. However, in such case, the spacing between the two zero-crossing-positions detected on, for example, the magnetic sensor arrays 5B and 5D along the two sides of the rectangular shape that are opposed to each other becomes so small that the angle resolution will decrease. In reality, however, the scanning over the number of times as discussed above is effective to compensate for reduction of the angle resolution, which results from reduction in size of the magnetic sensor arrays 5A to 5d, and, therefore, the surface area of the semiconductor chip 8 can be reduced while the angle resolution is kept at a value comparable with that exhibited when no size is reduced.

Figure 11:
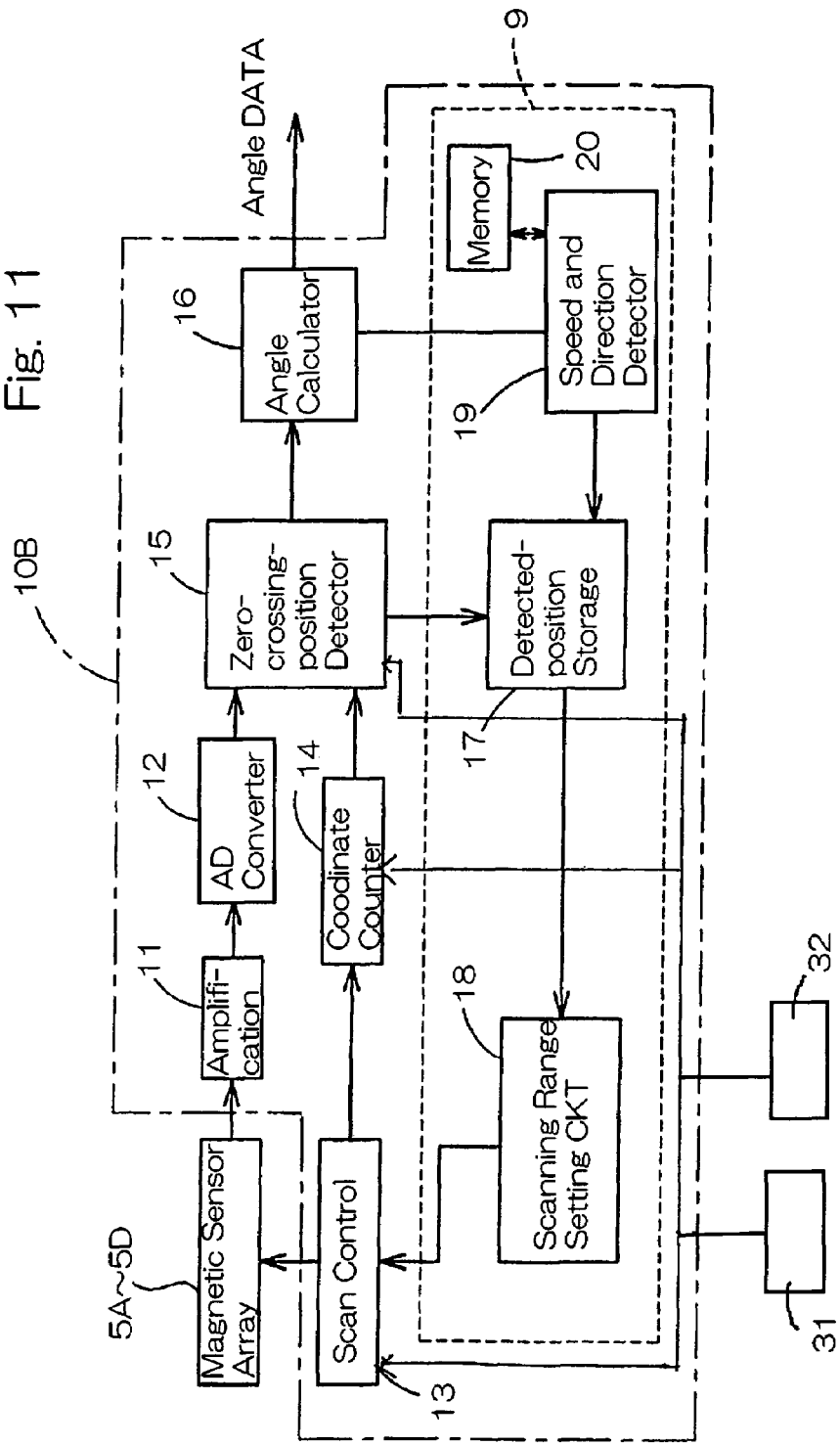
FIG. 11 is a block circuit diagram showing a circuit configuration of the signal processing circuit and the magnetic sensor array employed in the rotation angle detecting device according to a third preferred embodiment of the present invention.

A third preferred embodiment of the present invention will now be described with particular reference to FIG. 11. The third embodiment shown in FIG. 11 includes a circuit configuration similar to the circuit configuration including the magnetic sensor arrays and the signal processing circuit, both shown in and descried with reference to FIG. 5, except that the magnetic sensor element number setting circuit 31 and the scanning pattern setting circuit 32, both shown in and described with reference to FIG. 9, are additionally employed. With the use of the magnetic sensor element number setting circuit 31 and the scanning pattern setting circuit 32 in the circuit configuration shown in FIG. 11, the control is carried out by activating the scan control circuit 13, the coordinate counter 14 and the zero-crossing-position detector 15. In this third embodiment, as is the case with those according to the second embodiment, the magnetic sensor element number setting circuit 31 is operable to set the number of the magnetic sensor elements to be read out simultaneously and, on the other hand, the scanning pattern setting circuit 32 is operable to set the overlap of the magnetic sensor elements descried above and to select and set the extent to which the overlap is made. The scan control circuit 13, the coordinate counter 14 and the zero-crossing-position detector 15 operate in a manner similar to those shown and described in connection with the second embodiment.

Figure 12:
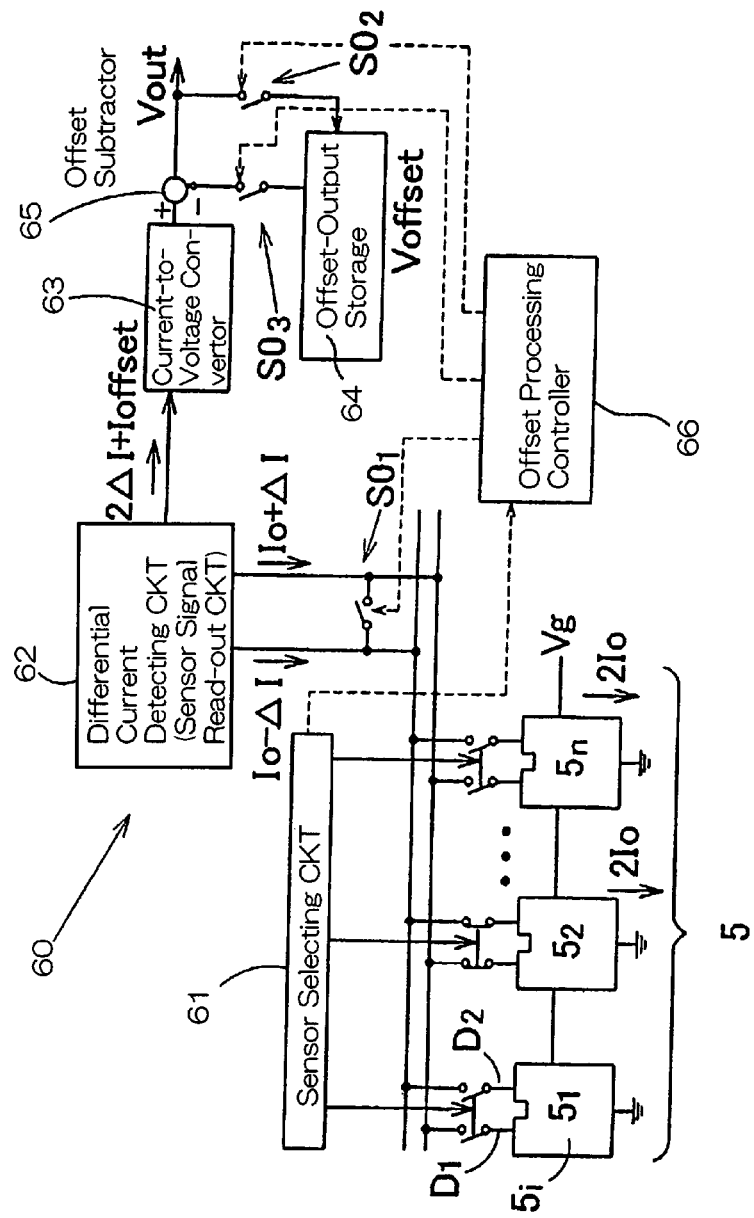
FIG. 12 is a block circuit diagram showing a circuit configuration of the magnetic sensor array circuit employed in the rotation angle detecting device according to a fourth preferred embodiment of the present invention.

The circuit configuration of the magnetic sensor array circuit employed in the rotation angle detecting device according to a fourth preferred embodiment of the present invention is shown in and will now be described with particular reference to FIGS. 12 to 16. The magnetic sensor array circuit now identified by 60 is a circuit for processing respective outputs from a magnetic sensor array 5 which includes a plurality of magnetic sensor elements 5i ($5_1$ to $5_n$) arranged in an array as shown in FIG. 12 and includes a sensor selecting circuit 61, a differential current detecting circuit 62, a current-to-voltage converting circuit 63, a short-circuiting switch S01, an offset-output storage 64, an offset subtractor 65 and an offset-processing controller 66.

Although a magnetic transistor of a field effect type (MAGFET) or a Hall element can be employed for each of the magnetic sensor elements 51 to 5n, the following description of the fourth embodiment will proceed as using the magnetic transistor (MAGFET) for each of the magnetic sensor elements 51 to 5n. The structure of the magnetic transistor T, which forms the respective magnetic sensor element $5_1$ to $5_n$, is shown in plan, sectional and perspective views in FIGS. 15A to 15C, respectively. The magnetic transistor T includes a source region 68 and a drain region 69, both formed on a surface layer of a p-Si substrate 67, and a gate electrode 72 formed on a p-Si substrate 67 via an oxidized film 71 at a location between the source region 68 and the drain region 69. The drain region 69 is split into two regions $69_1$ and $69_2$ separated from each other and has two output terminals D1 and D2, which serve as drain terminals and are formed respectively in those two regions $69_1$ and $69_2$.

In this magnetic transistor T, the Lorentz force acts on electrons e⁻ flowing from the source region 68 towards the drain region 69, when a magnetic field Bz is applied to an element surface in a direction perpendicular thereto. Accordingly, the electric currents $I_1$ and $I_2$ appearing at the respective output terminals D1 and D2 vary according to the intensity of the magnetic fields Bz and, accordingly, detection is made of the intensity of the magnetic field Bz applied to the magnetic transistor T. In other words, the magnetic transistor T detects the imbalance of a circuit current, which is generated when the magnetic fields Bz developed in the element surface in a direction perpendicular thereto are applied thereto.

Figure 15A:
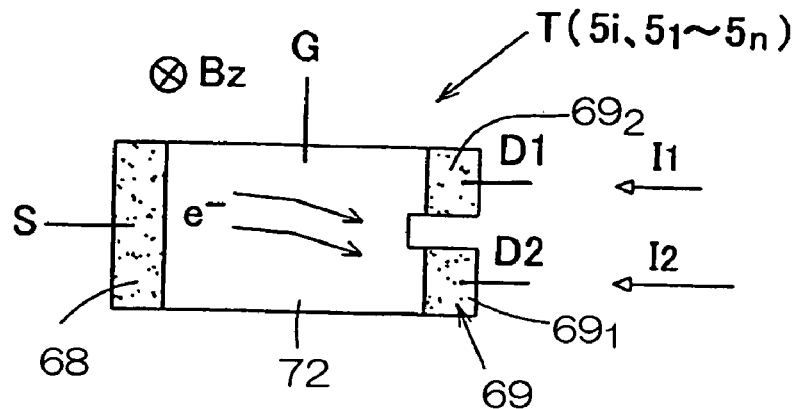
FIG. 15A is a plan view of a magnetic transistor, which forms the magnetic sensor element in the magnetic sensor array circuit in FIG. 12.
Figure 15B:
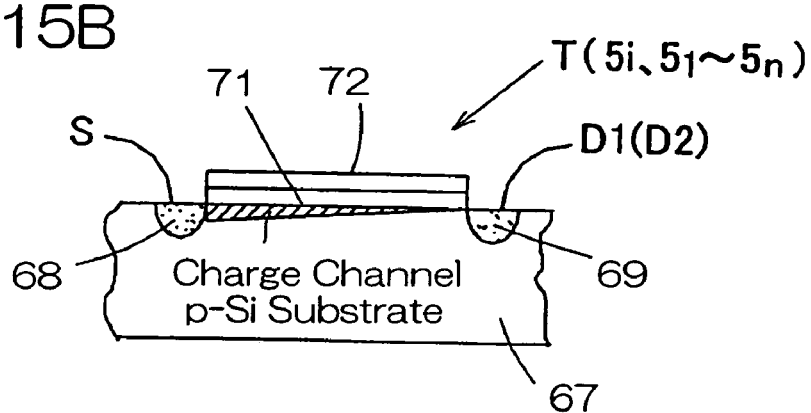
FIG. 15B is a sectional view of the magnetic transistor shown in FIG. 15A.
Figure 15C:
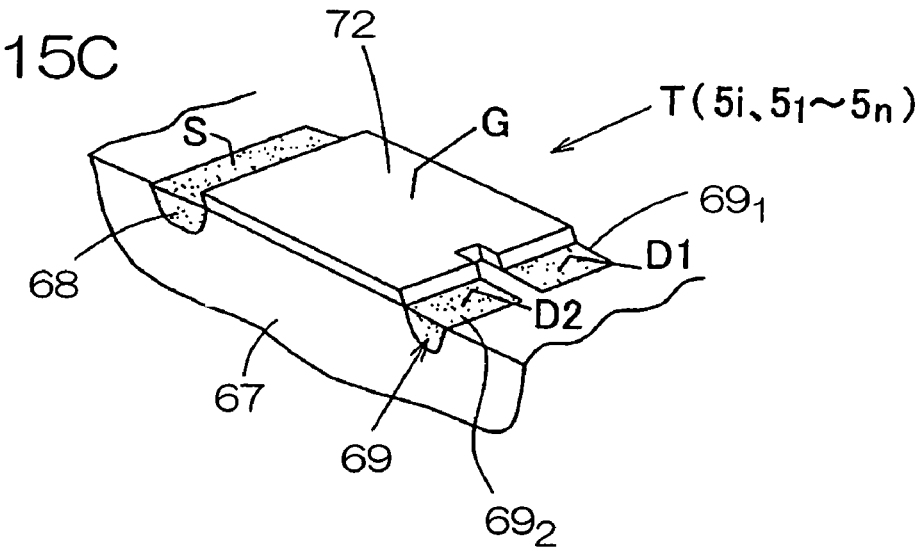
FIG. 15C is a perspective view of the magnetic transistor shown in FIG. 15A.
Figure 16A:
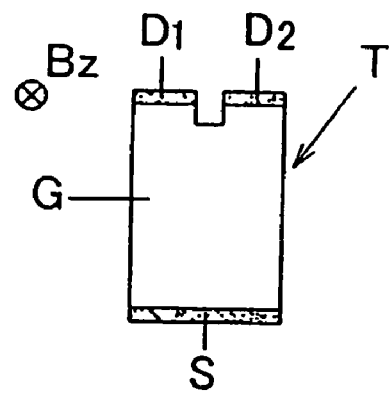
FIG. 16A is a plan view of the magnetic transistor.
Figure 16B:
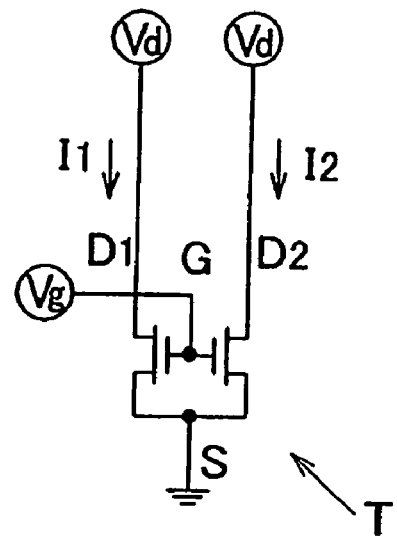
FIG. 16B is a circuit diagram of the magnetic transistor.

The magnetic transistor T shown in and described with reference to FIGS. 15A to 15C can be expressed in an equivalent circuit shown in FIG. 16B, and the difference between the electric currents $I_1$ and $I_2$ appearing at the respective output terminals D1 and D2 will forms a magnetic field signal indicative of the intensity of the magnetic fields Bz. FIG. 16A illustrates a plan view of this magnetic transistor T.

Referring to FIG. 12, the sensor selecting circuit 61 forms a circuit for selecting and activating one of the magnetic sensor elements $5_1$ to $5_n$ in a predetermined sequence.

The differential current detecting circuit 62 forms a sensor signal read-out circuit and is operable to extract the difference 2ΔI between two electric currents in the magnetic sensor elements $5_1$ to $5_n$.

The current-to-voltage converting circuit 63 is a circuit operable to convert the differential current, extracted by the differential current detecting circuit 62, into a voltage signal Vout and then to output it as a sensor signal. With the differential current detecting circuit 62 and the current-to-voltage converting circuit 63, the differential current appearing when the magnetic fields are applied to the magnetic sensor elements $5_1$ to $5_n$ can be extracted and amplified to a voltage signal and the sensor signal can be obtained in the form of a voltage signal.

The short-circuiting switch S01 is provided on an input side of the differential current detecting circuit 62, which is the sensor signal read-out circuit, and serves as a device for creating a condition, in which the two output terminals D1 and D2 of the magnetic sensor elements $5_1$ to $5_n$ are short-circuited together. The offset-output storage 64 stores a value of a reference offset, which is represented by an output signal of the differential current detecting circuit 62 under the short-circuited condition made by the short-circuiting switch S01. The offset-output storage 64 may be in the form of an analog element such as, for example, a capacitor or in the form of an element capable of storing a digital value of the offset error, which has been converted by an AD converter.

The offset subtractor 65 subtracts a reference offset, stored in the offset-output storage 64, from an output signal from the differential current detecting circuit 62 during a condition, in which the short-circuiting of the short-circuiting switch S1 is released. This offset subtractor 65 may make use of a circuit of a type, in which subtraction is performed with digital values, although it may be in the form of an analog subtracting circuit.

The offset-processing controller 66 controls respective operations of the short-circuiting switch S01, offset-output storage 64 and the offset subtractor 65 in accordance with preset standards. The respective operations of the offset-output storage 64 and offset subtractor 65 are controlled by the open or closure of switches S02 and S03, respectively. The offset-processing controller 66 is rendered to control the respective operations of the short-circuiting switch S01, offset-output storage 64 and offset subtractor 65 each time the magnetic sensor array 5 in its entirety is read out, or each time each of the sensor arrays 5A to 5D, which are line sensors forming the magnetic sensor array 5, is read out, or each time the individual magnetic sensor elements 5i are read out.

When the short-circuiting switch S01, the offset-output storage 64 and the offset subtractor 65 are controlled by the offset-processing controller 66, it is possible to extract a signal component by cancelling the offset of the differential current detecting circuit 62 in the following manner.

Where the offset-processing controller 66 is subjected to an offset processing for each sensor array 5A to 5D forming the magnetic sensor array 5, the various components S01, 64 and 65 referred to above are controlled in the following manner. Namely, before or after the signal of each of the sensor arrays 5A to 5D, forming the respective line sensors, are sequentially read out, the operation to read out the signal is carried out while the short-circuiting switch S01 is once closed. In this condition, an output data is Voffset, the voltage of which is stored. When the signal of the line sensor is sequentially read out with the short-circuiting switch S01 opened, the Voffset is subjected to the subtraction. In this way, the offset of the differential current detecting circuit 62 is cancelled and only the signal component can be extracted.

Where the offset-processing controller 66 is processed each time the magnetic sensor array 5 in its entirety is read out, the same processing as that described above takes place, except that the unit of processing changes from the above described processing for each of the sensor arrays 5A to 5D to the entirety of the magnetic sensor array 5.

Figure 13:
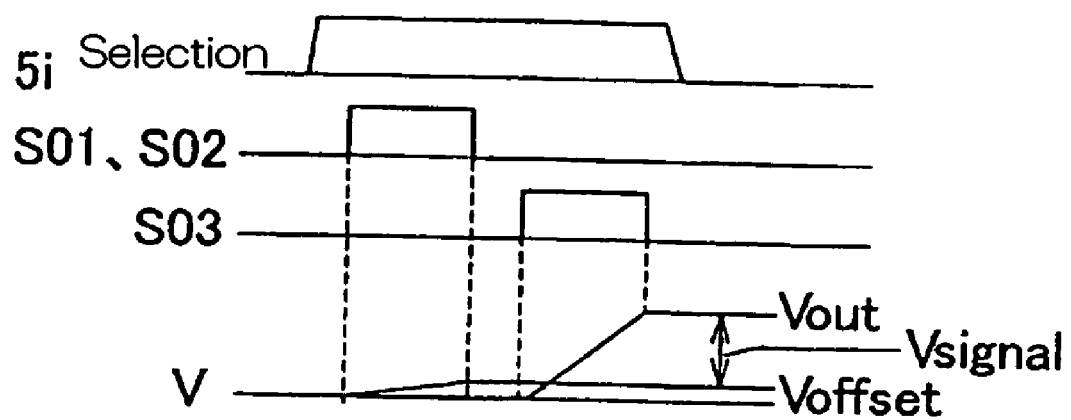
FIG. 13 is a timing chart showing the sequence of operation of the circuits in FIG. 12.

An example of the circuit configuration and an example of operation during the condition, in which each of the magnetic sensor elements 5i is selected, where the offset-processing controller 66 performs the offset processing for each of the individual magnetic sensor elements 5i, will now be described with reference to FIG. 12 and the timing chart of FIG. 13, respectively.

In this case, the switch S02 is provided, which operates simultaneously with the short-circuiting switch S01 so that an output voltage can be stored in the offset-output storage 64. This switch S02 for the storage is disposed between an output terminal of the differential current detecting circuit 62 and the offset-output storage 64. The switch S03 referred to above for the subtraction is provided between a negative input terminal of the offset subtractor 65 and the offset-output storage 64.

In the case of this construction, since when the short-circuiting switch S01 and the storage switch S02 are turned on, an input to the differential current detecting circuit 62 is held in a short-circuited condition, the differential current will be zero under normal conditions, but a slight electric current is outputted due to the offset of the differential current detecting circuit 62. The offset voltage, obtained by converting this offset current Ioffset into a voltage, is stored in the offset-output storage 64 through the storage switch S02.

After the short-circuiting switch S01 and the storage switch S02 have been turned on for a predetermined period, the short-circuiting switch S01 and the storage switch S02 are turned off while the magnetic sensor element 5i is kept selected. Accordingly, the sum of 2ΔI of the sensor current plus the offset current Ioffset is outputted from the differential current detecting circuit 62. When this current is converted into a voltage and the storage switch S03 is turned on for a predetermined period, the offset subtractor 65 subtracts the offset voltage Voffset and only the signal component Vsignal of the magnetic sensor element 5i is extracted.

Through the above described operation, only the signal component of the magnetic sensor element 5i can be extracted by executing the operation to read out the sensor signal and cancelling influences brought about by the offset in the circuit. According to this construction, variation of sensor data read out caused by the circuit offset and its temperature change can be suppressed, allowing the accuracy of detection of the angle of rotation or the like to be increased.

In this case, the operation to remove the offset component may be accomplished by means of the subtraction as an analog voltage with the use of a capacitor or through the subtraction while it is stored in the form of digital data after the AD conversion.

FIG. 14 illustrates an example of the circuit configuration, and an example of operation, where the subtraction of the offset is carried out in the current-to-voltage converting circuit 63.

This current-to-voltage converting circuit 63 includes an integrating circuit utilizing switches φS1, φS2, φR1 and φR2 and a capacitor C. The switches φS1 and φS2 are provided in series in this order in a circuit portion provided in parallel to an operational amplifier 41 and between an inverting input terminal thereof and an output terminal thereof. The switches φR1 and φR2 are similarly provided in series in this order in a circuit portion provided in parallel to an operational amplifier 41 and between an inverting input terminal thereof and an output terminal thereof. The capacitor C is connected in series between the switches φS1 and φS2 and is also interposed in series between the switches φR1 and φR2.

Figure 14A:
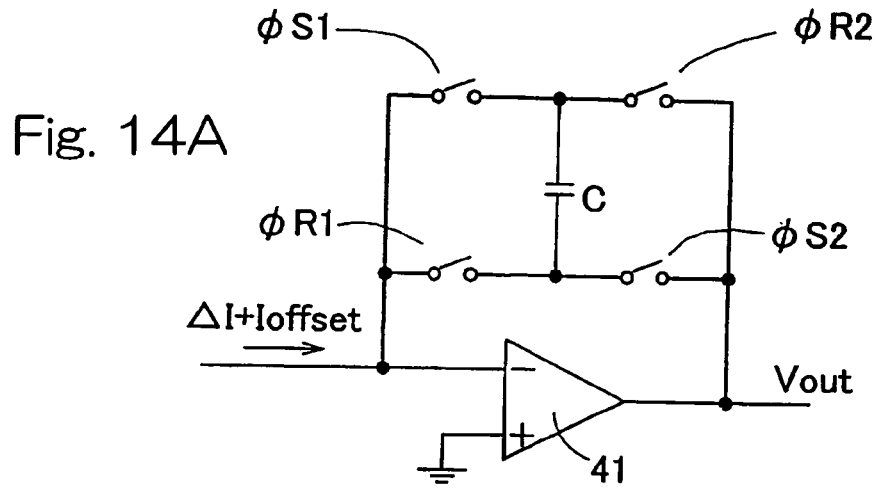
FIG. 14 illustrates examples of a circuit applicable where a current-to-voltage converting circuit is employed in the form of an integrated circuit.
Figure 14B:
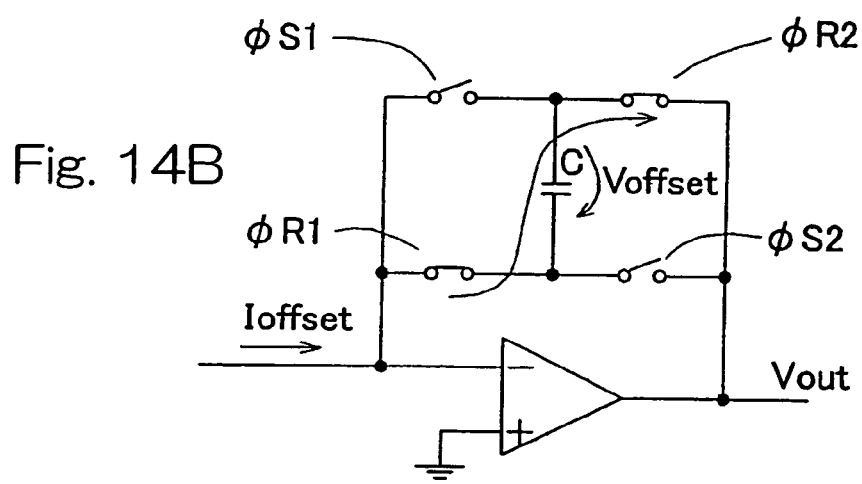
Figure 14C:
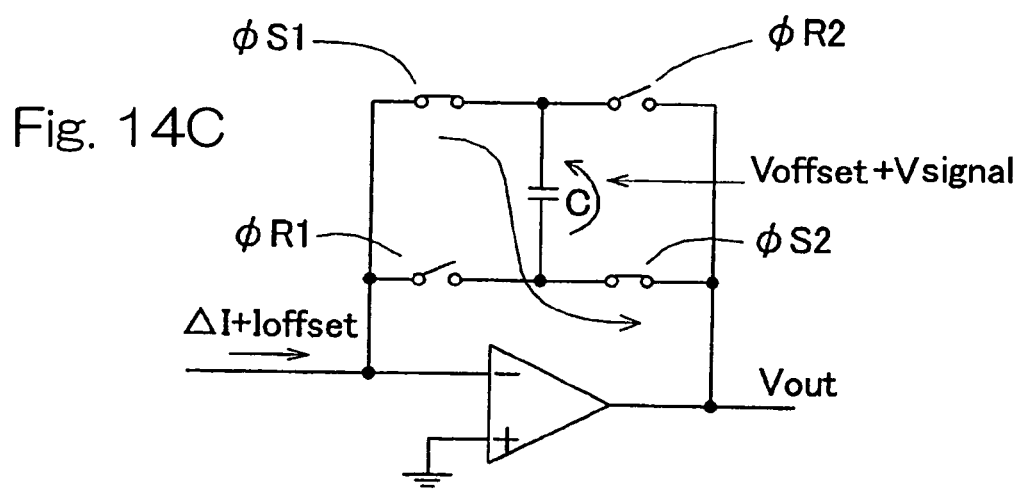

In this circuit configuration, the time of accumulation of the offset current in the capacitor C is set to be equal to the time of accumulation of (sensor signal)+(offset current), so that the respective amounts of accumulation can be counter-balanced with each other to allow cancellation of the offset component and conversion into a voltage signal to be accomplished simultaneously. The control to set those accumulating times to be equal to each other is performed by the offset-processing controller 66 shown in FIG. 12. Also, the circuit configuration shown in FIGS. 14A to 14C is an example, in which only one capacitor C is employed, which capacitor C corresponds to the offset-output storage 64 shown in FIG. 11. Also, this integrated circuit concurrently serves as the offset subtractor 65 shown in FIG. 12.

Hereinafter, the operation will be described. When the switches φS1, φS2, φR1 and φR2 shown in FIG. 14A are turned on while the magnetic sensor element 5i is selected, the charge on the capacitor C is reset.

Then, the condition, in which the input of the differential current detecting circuit 62 shown in FIG. 12, which is a sensor signal read-out circuit, is short-circuited and only the offset current of this circuit 62 is outputted, is shown in FIG. 14B. At this time, the switches of the integrating circuit are such that the switches φR1 and φR2 are kept turned on for a predetermined time Ts. By so doing, the capacitor C is charged by the integrating operation with a charge, which is expressed by Q1=Ioffset×Ts, and, hence, the terminal voltage when the switches φR1 and φR2 are turned off will be Voffset=Q1/C.

Thereafter, the condition, in which the short-circuiting of the input of the differential and (sensor signal)+(offset) is inputted to the integrating circuit, is shown in FIG. 14C.

In this condition, the switch φS1 and φS2 are turned on to perform the integrating operation in a direction reverse to the condition in which the offset is accumulated. By the integrating operation for the predetermined time Ts, the charge stored in the capacitor C becomes Q2=(Ioffset+ΔI)×Ts. Since there exists the charge −Q1 formed during the previous offset accumulation, the terminal voltage of the capacitor C will be;

$$Vout = (Q2 - Q1)/C$$
$$= \Delta I \times Ts/C$$

and the offset component Ioffset is removed and only the signal component is, after having been converted into a voltage, outputted.

According to the foregoing construction, since there is no need to use an extra circuit for storing an output voltage resulting from the offset and subtracting it from the sensor output, not only can the circuit be simplified, but the surface area for arrangement can be minimized, and, accordingly, the cost of manufacture of the sensor entirety including the magnetic array sensor circuit 60 can be suppressed.

Figure 17:
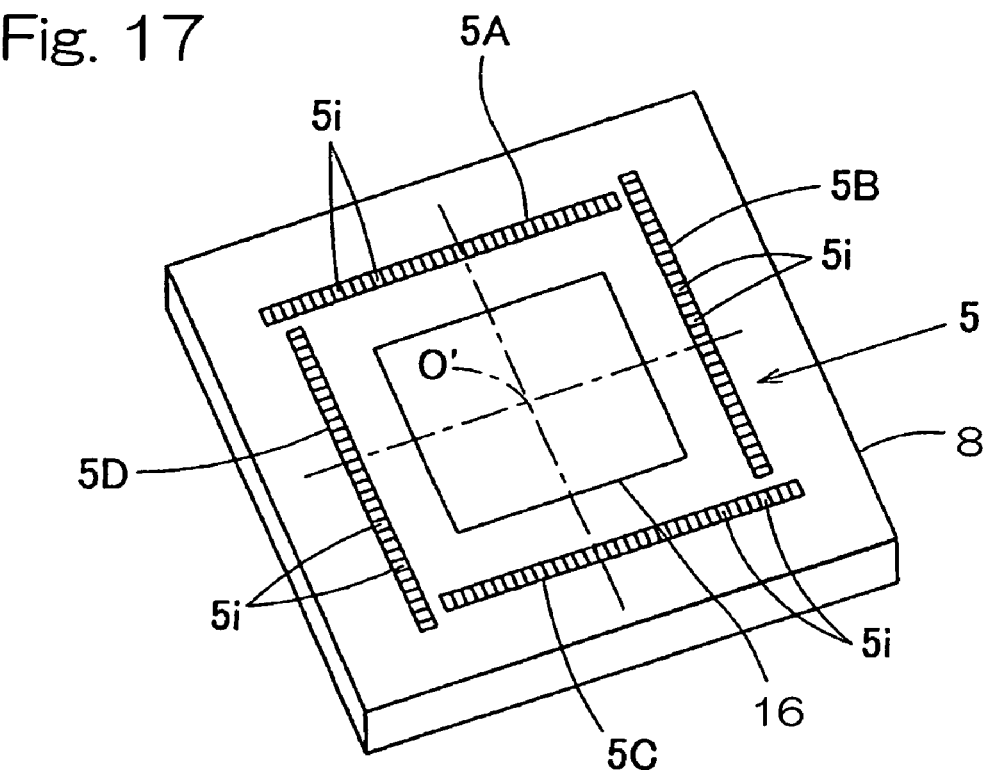
FIG. 17 is a perspective view showing a semiconductor chip in the rotation angle detecting device equipped with the magnetic sensor array circuit in FIG. 12.

The magnetic sensor array 5 is a sensor for detecting magnetism emanating from the magnet 4 and is arranged on the stationary member 2 so as to confront in an axial direction of the axis of rotation O of the rotatable member 1. In the illustrated instance in FIG. 17, the magnetic sensor array 5 is arranged on the surface of the single semiconductor chip 8 so as to occupy a respective position corresponding to one of the four sides of the imaginary shape of a rectangle. The geometric center O' of the rectangular shape is matched with the axis of rotation O of the rotatable member 1. The semiconductor chip 8 so formed with the magnetic sensor arrays 5 is fitted to the stationary member 2 with its element formed surface held in face-to-face relation with the magnet 4. The semiconductor chip 8 is a silicon chip.

Figure 18:
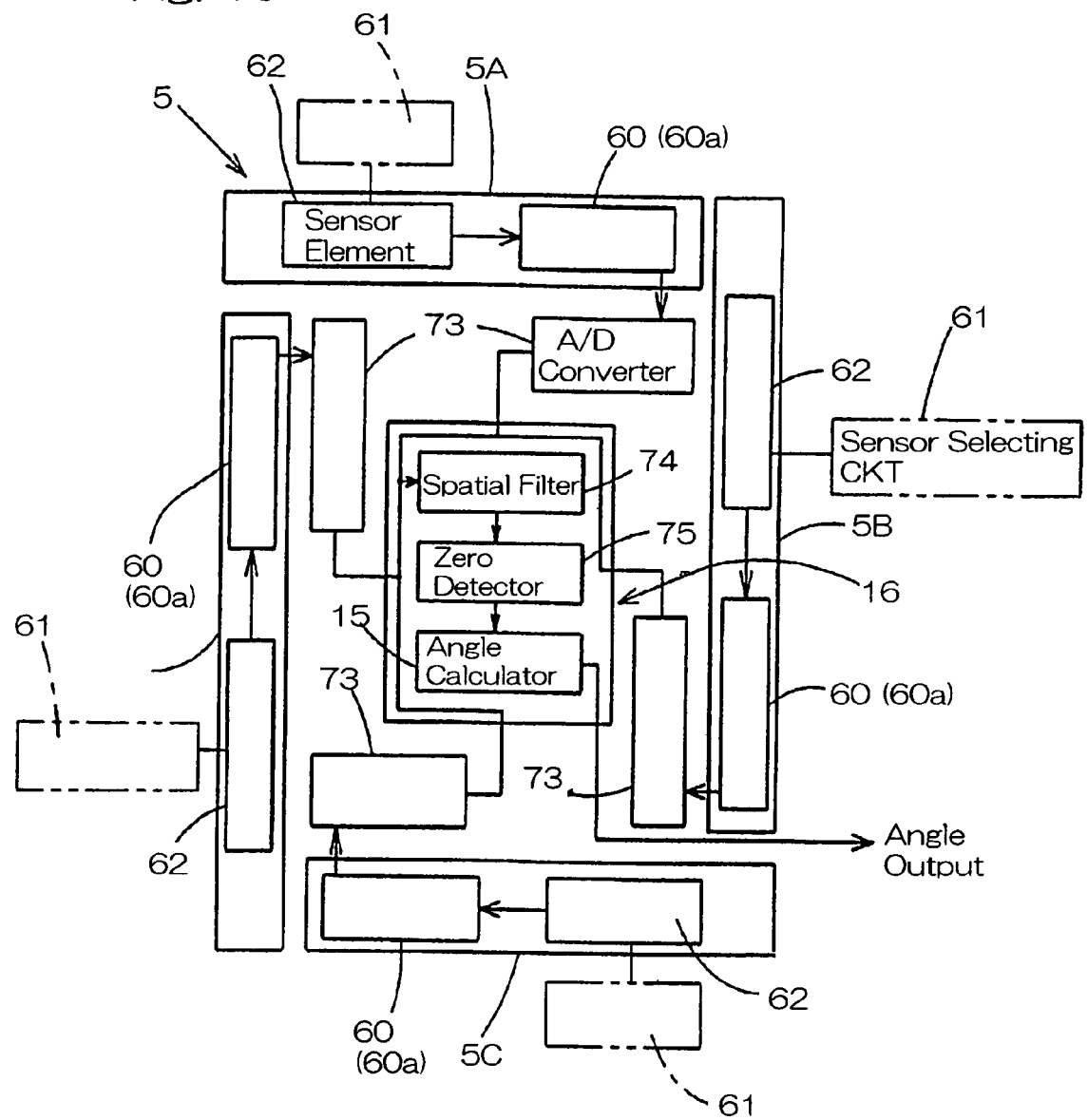
FIG. 18 is a block diagram showing an example of a circuit configuration on the semiconductor chip used in the rotation angle detecting device equipped with the magnetic sensor array circuit in FIG. 12.

FIG. 18 illustrates a conceptual configuration of the circuit on the semiconductor chip 8, which is applicable where an absolute output is obtained from the angle calculator 16. Each of the sensor arrays 5A to 5D is constituted by the magnetic array sensor circuit 60 of the present invention, which is provided with the magnetic sensor elements 51 to 5n and a read-out section 60a. Also, an A/D converter circuit 73 for digitalizing an analog signal outputted from the magnetic array sensor circuit 60 is arranged between each of the sensor arrays 5A to 5D and the angle calculator 16. This A/D converter circuit 73 corresponds to the previously described AD converter circuit 12. The angle calculator 16 includes a spatial filter unit 16 for removing a noise component from an digital output of each of the A/D converter circuits 73, a zero detecting unit 75 for detecting a zero crossing of the distribution of magnetic fields from an output of the spatial filter section 74, and an angle calculating unit 15 for calculating the angle of rotation of the magnet 4 (magnetic generator) from an output of the zero detecting unit 75. The spatial filter unit 74 has a function of reducing the noise component resulting from sensor variation, by digitally filtering an output from the magnetic sensor array S and may be employed in the form of, for example, a comb-shaped filter.

As hereinabove described, according to the magnetic sensor array circuit shown and described in connection with the fourth embodiment of the present invention, the circuit configuration capable of reading out the sensor signal free from influences brought about by change in environment can be realized with no need to use any reference sensor element such as hitherto employed.

Figure 19:
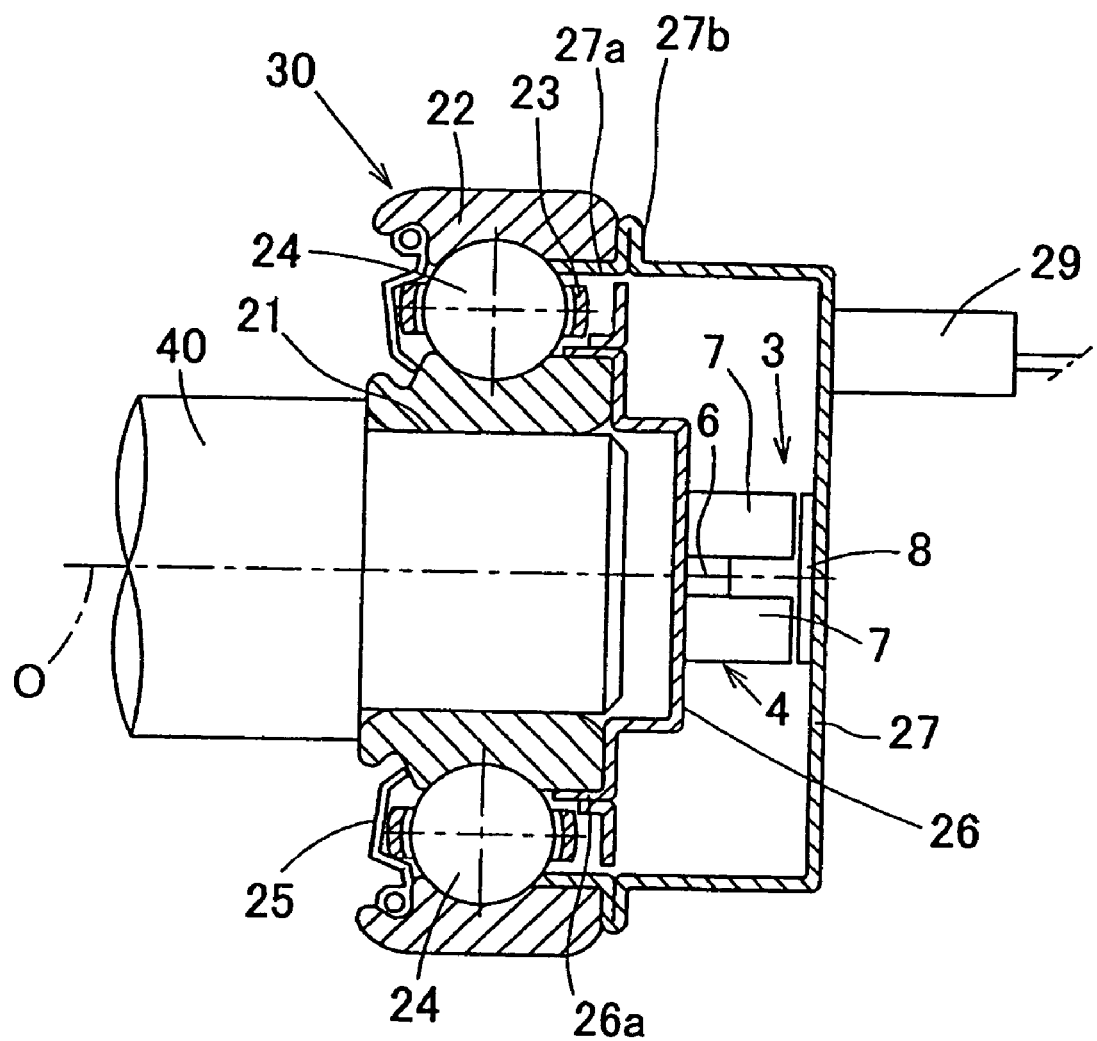
FIG. 19 is a sectional view showing an example of a bearing assembly equipped with the rotation angle detecting device according to any one of the preferred embodiments of the present invention.

FIG. 19 illustrates an example of a rolling bearing assembly, in which the rotation angle detecting device 3 according to any one of the first to fourth embodiments of the present invention is incorporated. The rolling bearing assembly 30 is of a type having rolling elements 24 retained by a retainer 23 and interposed between respective rolling surfaces of inner and outer races 21 and 22. The rolling elements 24 are in the form of a ball and the rolling bearing assembly 30 is rendered to be a deep groove ball bearing assembly. Also, a sealing member 25, which covers one of opposite ends of a bearing space, is fitted to the outer race 22. The inner race 21 mounted on a rotary shaft 40 for rotation together therewith is supported by the outer race 22 through a row of the rolling elements 24. The outer race 22 is installed in a housing (not shown) of a machine or equipment utilizing the bearing assembly.

A magnetic-generator fitting member 26 is fitted to the inner race 21 and the magnetic generator 4 is fitted to this magnetic generator fitting member 26. The magnetic-generator fitting member 26 is provided so as to cover an inner diametric hole at one end of the inner race 21 and has a cylindrical portion 26a provided in an outer peripheral edge. This magnetic-generator fitting member 26 is fitted to the inner race 21 with the cylindrical portion 26a thereof engaged around an outer peripheral surface of a shoulder of the inner race 21. Also, a side plate portion in the vicinity of the cylindrical portion 26a is engaged with an end face of the inner race 21 to position the inner race 21 axially.

The outer race 22 is fitted to a sensor fitting member 27, and the semiconductor chip 8 integrated with the magnetic sensor arrays 5A to 5D or the magnetic sensor array circuit 50 and the signal processing circuit 10 (10A) is fitted to this sensor fitting member 27. An output cable 29 for drawing an output from the angle calculator 14 is also fitted to this sensor fitting member 27. The sensor fitting member 27 has a cylindrical free end portion 27a formed in the outer periphery thereof, which is inserted into an inner diametric surface of the outer race 22. A collar 27b formed in the vicinity of the cylindrical free end portion 27a of the sensor fitting member 27 is engaged with an end face of the outer race 22 to position the outer race 22 axially.

As hereinabove described, integrating the rotation angle detecting device 3 with the bearing assembly 30 in the manner described above is effective to reduce the number of component parts of the machine or equipment using the bearing assembly and the number of assembling steps thereof and also to achieve a downsizing. In such case, even though the rotation angle detecting device 3 is used in any bearing of the machine or equipment operated at high speeds or in any bearing used in a control system or the like that requires a high speed response, detection of the angle of rotation with high precision is possible since the rotation angle detecting device 3 affords the detection of the rotation angle at high speed and with high precision.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation angle detecting device, which comprises:
a magnetic generator arranged in a rotatable member and having a magnetic anisotropy in a circumferential direction around an axis of rotation;
a plurality of linear magnetic sensor arrays arranged on a stationary member, confronting the magnetic generator in a direction along the rotational axis of the rotatable member;
an AD converter circuit for converting respective outputs of the magnetic sensor arrays into digital signals;
a zero-crossing-position detector for detecting a zero-crossing-position in a distribution of magnetic field in reference to an output of the AD converter circuit;
an angle calculator for detecting an angle of rotation of the magnetic generator in reference to the zero-crossing-position detected by the zero-crossing-position detector;
a detected-position storage for storing the zero-crossing-position, which is detected by the zero-crossing-position detector for each cycle of processing;
a scanning range setting circuit for setting a subsequent scanning range for the magnetic sensor array at a predetermined standard on the basis of the zero-crossing-position that has been stored; and
a scanning circuit for reading a detection signal of the magnetic sensor array within the scanning range set by the scanning range setting circuit;
wherein the zero-crossing-position detector is operable to detect the zero-crossing-position with use of a partial detection signal of the scanning range that is a limited part of the magnetic sensor array and the angle calculator is operable to detect the angle of rotation in reference to the zero-crossing-position detected from the partial detection signal.

2. The rotation angle detecting device as claimed in claim 1, wherein the magnetic sensor array is arranged in four in number on a plane perpendicular to the axis of rotation so as to occupy one of four sides of an imaginary shape of a rectangle.

3. The rotation angle detecting device as claimed in claim 1, further comprising a speed and direction detector for detecting a speed and direction of rotation of the magnetic generator in reference to a result of detection of the angle by the angle calculator for each cycle and wherein the scanning range setting circuit sets a scanning range at a predetermined standard with use of the number of data used in zero crossing calculation and a shift component of the zero-crossing-position incident to a rotatory shift of the magnetic generator, based on a record on the speed and direction of rotation detected by the speed and direction detector.

4. The rotation detecting device as claimed in claim 1, in which the scanning circuit for scanning the magnetic sensor array comprises a magnetic sensor element selecting circuit capable of simultaneously selecting a plurality of neighboring magnetic sensor elements during a signal read-out of the magnetic sensor array and is capable of sequentially scanning while simultaneously selecting the plurality of magnetic sensor elements.

5. The rotation angle detecting device as claimed in claim 1, further comprising a sensor selecting circuit for selecting the magnetic sensor elements to sequentially read out, a sensor signal read-out circuit for reading a detection signal from the selected magnetic sensor element, a short-circuiting switch provided at an input side of the sensor signal read-out circuit for creating a condition, in which two output terminals of the magnetic sensor element are short-circuited together, an offset-output storage for storing an output signal of the sensor signal read-out circuit as a reference offset during the short-circuited condition created by the short-circuiting switch, and an offset subtractor for subtracting the reference offset, stored in the offset-output storage, from the output signal of the sensor signal read-out circuit during a condition, in which short-circuiting performed by the short-circuiting switch is released.

6. The rotation detecting device as claimed in claim 1, further comprising device provided for the scanning circuit for setting a scanning pattern from outside.

7. A rotation angle detecting device equipped bearing assembly comprising a rotation angle detecting device of a structure described in claim 1.

* * * * *